(12) United States Patent
Benisty

(10) Patent No.: US 12,430,073 B2
(45) Date of Patent: Sep. 30, 2025

(54) MANAGED FETCHING AND EXECUTION OF COMMANDS FROM SUBMISSION QUEUES

(71) Applicant: SanDisk Technologies LLC, Addison, TX (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 465 days.

(21) Appl. No.: 17/940,598

(22) Filed: Sep. 8, 2022

(65) Prior Publication Data
US 2023/0004329 A1 Jan. 5, 2023

Related U.S. Application Data

(60) Division of application No. 16/425,835, filed on May 29, 2019, now Pat. No. 11,467,769, which is a
(Continued)

(51) Int. Cl.
*G06F 3/06* (2006.01)

(52) U.S. Cl.
CPC .......... *G06F 3/0659* (2013.01); *G06F 3/0629* (2013.01); *G06F 3/0658* (2013.01); *G06F 3/0679* (2013.01)

(58) Field of Classification Search
CPC ........ G06F 12/00; G06F 13/00; G06F 3/0659; G06F 3/0679; G06F 3/0658; G06F 3/0629
See application file for complete search history.

(56) References Cited

U.S. PATENT DOCUMENTS 5,724,613 A * 3/1998 Wszolek ............. G06F 13/1631
710/33
5,948,081 A 9/1999 Foster
(Continued)

FOREIGN PATENT DOCUMENTS

CN 1645316 A 7/2005
CN 101243421 A 8/2008
(Continued)

OTHER PUBLICATIONS

"NVM Express," Specification Revision 1.2, http://nvmexpress.org/wp-content-uploads-NVM_Express_1_2_Gold_20141209.pdf, pp. 1-205 (Nov. 3, 2014).

*Primary Examiner* — Tim T Vo
(74) *Attorney, Agent, or Firm* — LOZA & LOZA, LLP; Gabriel Fitch

(57) ABSTRACT

The disclosure relates in some aspects to managing the fetching and execution of commands stored in submission queues. For example, execution of a command may be blocked at a data storage apparatus due to an internal blocking condition (e.g., a large number of commands of a particular type are pending for execution at the data storage device). As another example, execution of a command may be blocked at a data storage apparatus due to an external blocking condition (e.g., a host device may specify that certain commands are to be executed immediately one after another). The disclosure relates in some aspects to controlling how commands are fetched and executed so that commands that cannot be executed by the data storage apparatus in the near future do not prevent other commands (that are not subject to the same blocking condition) from being executed.

10 Claims, 15 Drawing Sheets

Related U.S. Application Data continuation-in-part of application No. 15/908,710, filed on Feb. 28, 2018, now Pat. No. 10,642,500, which is a continuation-in-part of application No. 14/868,373, filed on Sep. 28, 2015, now Pat. No. 9,927,983.

(56) References Cited

U.S. PATENT DOCUMENTS

| | | | |
|---|---|---|---|
| 7,323,970 B1 | 1/2008 | Murray et al. | |
| 9,927,983 B2 | 3/2018 | Benisty et al. | |
| 2002/0062414 A1 | 5/2002 | Hofmann et al. | |
| 2009/0300320 A1* | 12/2009 | Zhang | G06F 12/0862 |
| | | | 711/213 |
| 2011/0161552 A1 | 6/2011 | Lund et al. | |
| 2012/0297143 A1* | 11/2012 | Ito | G06F 12/126 |
| | | | 711/E12.001 |
| 2013/0086311 A1 | 4/2013 | Huang et al. | |
| 2014/0003184 A1 | 1/2014 | Quach et al. | |
| 2014/0129749 A1 | 5/2014 | Bass et al. | |
| 2014/0164724 A1 | 6/2014 | Cheng et al. | |
| 2015/0301964 A1 | 10/2015 | Brinicombe et al. | |
| 2016/0188210 A1 | 6/2016 | Tanzawa | |
| 2016/0306678 A1 | 10/2016 | Hira et al. | |
| 2017/0090753 A1 | 3/2017 | Benisty et al. | |
| 2018/0188975 A1 | 7/2018 | Benisty | |
| 2018/0217951 A1 | 8/2018 | Benisty et al. | |

FOREIGN PATENT DOCUMENTS

| | | |
|---|---|---|
| CN | 102053930 A | 5/2011 |
| CN | 106527967 A | 3/2017 |
| CN | 107885456 A | 4/2018 |
| CN | 109471817 A | 3/2019 |
| WO | 2018175062 A1 | 9/2018 |

* cited by examiner

MANAGED FETCHING AND EXECUTION OF COMMANDS FROM SUBMISSION QUEUES

CROSS-REFERENCE TO RELATED APPLICATION(S)

This application is a divisional of U.S. patent application Ser. No. 16/425,835, filed on May 29, 2019, which is a continuation-in-part of U.S. patent application Ser. No. 15/908,710, filed on Feb. 28, 2018, now U.S. Pat. No. 10,642,500, which is a continuation-in-part of U.S. patent application Ser. No. 14/868,373, filed on Sep. 28, 2015, now U.S. Pat. No. 9,927,983, the entire content of each of which is incorporated herein by reference.

FIELD

The disclosure relates, in some embodiments, to non-volatile memory (NVM) devices and memory controllers and host devices for use therewith. More specifically, but not exclusively, the disclosure relates to a data storage apparatus that fetches commands from host-side submission queues and executes those commands.

INTRODUCTION

Data storage apparatuses incorporating NVM devices, such as flash NAND memories, are replacing or supplementing conventional rotating hard disk drives for mass storage in many consumer or industrial electronics and computers. Typically, a host device may include or communicate with a device controller that in turn controls access to one or more NVM devices (e.g., NVM arrays). For example, the host device may issues write command and read command to a device controller of a data storage apparatus incorporating an NVM device to write data to and read data from the NVM device.

In an NVM express (NVMe) system, a host device writes data storage apparatus commands, such as read commands, write commands, and administrative commands, in submission queues, which are implemented in a memory of the host device. The data storage apparatus fetches the commands from the submission queues and executes the commands. The data storage apparatus then places entries in completion queues, which are also implemented in host memory, to notify the host device of completion of the commands. There are typically multiple submission queues allocated by the host device. Accordingly, during each round of submission queue access, the data storage apparatus determines which submission queue is to be accessed to obtain the next command to be processed.

The NVMe standard, the current version of which is NVM Express, Revision 1.3d, Mar. 20, 2019, the disclosure of which is incorporated herein by reference in its entirety, describes two techniques by which a device controller may select commands from submission queues. One technique uses a round-robin arbiter, in which the device controller selects commands from the submission queues in round-robin order. Another technique uses a weighted round-robin arbiter where the submission queues are assigned static priorities or weights, and commands are selected from submission queues in round-robin order using weights to determine the selection order in each round.

In either case, the next command to be fetched from a submission queue is based on static arbitration logic that either implements no priorities, as in the round-robin case, or that implements only static, host-defined priorities, as in the weighted round-robin case. Such static arbitration logic may be sufficient if the storage device has sufficient resources to handle all host I/O requests. In practice, however, the storage resources of a data storage apparatus may be limited and the demands of the host device on those resources may exceed the capability of the data storage apparatus to promptly process host commands. Accordingly, there is a need for more effective techniques for managing the use of data storage apparatus commands stored in submission queues.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage apparatus that includes a non-volatile memory array, an interface, and a processor coupled to the non-volatile memory array and the interface. In one example, the processor is configured to: fetch a command from a submission queue of another apparatus via the interface, determine that execution of the command is currently blocked, and control the execution of the command based on the determination that execution of the command is currently blocked.

One embodiment of the disclosure provides a data storage method. In one example, the method includes: fetching a command from a submission queue of another apparatus via the interface, determining that execution of the command is currently blocked, and controlling the execution of the command based on the determination that execution of the command is currently blocked.

One embodiment of the disclosure provides a data storage apparatus. In one example, the apparatus includes: means for fetching a command from a submission queue, optional means for storing the command in a command slot of the data storage apparatus; means for determining that execution of the command is currently blocked (e.g., due to a condition internal to the data storage apparatus or due to a condition external to the data storage apparatus), and means for controlling the execution of the command based on the determination that execution of the command is currently blocked.

One embodiment of the disclosure provides a non-transitory computer-readable medium storing computer-executable code for storing data. In one example, the computer-readable medium includes code to: fetch a command from a submission queue of another apparatus via the interface, determine that execution of the command is currently blocked, and control the execution of the command based on the determination that execution of the command is currently blocked.

One embodiment of the disclosure provides a data storage apparatus that includes a non-volatile memory array, an interface, and a processor coupled to the non-volatile memory array and the interface. In one example, the processor is configured to: receive an indication from another apparatus via the interface, wherein the indication indicates that at least one submission queue of a plurality of submission queues of the other apparatus contains at least one command, estimate, based on the indication, whether a first submission queue of the plurality of submission queues contains a plurality of commands having a defined execution order, and collectively fetch the plurality of commands from the first submission queue as a result of the estimation.

One embodiment of the disclosure provides a data storage method. In one example, the method includes: receiving an indication from another apparatus via the interface, wherein the indication indicates that at least one submission queue of a plurality of submission queues of the other apparatus contains at least one command; estimating, based on the indication, whether a first submission queue of the plurality of submission queues contains a plurality of commands having a defined execution order; and collectively fetching the plurality of commands from the first submission queue as a result of the estimation.

One embodiment of the disclosure provides a data storage apparatus. In one example, the apparatus includes: means for receiving an indication, wherein the indication indicates that at least one submission queue of a plurality of submission queues of the other apparatus contains at least one command; optional means for storing the command in a command slot of the data storage apparatus; means for estimating, based on the indication, whether a first submission queue of the plurality of submission queues contains a plurality of commands having a defined execution order; and means for collectively fetching the plurality of commands from the first submission queue as a result of the estimation.

One embodiment of the disclosure provides a non-transitory computer-readable medium storing computer-executable code for storing data. In one example, the computer-readable medium includes code to: receive an indication from another apparatus via the interface, wherein the indication indicates that at least one submission queue of a plurality of submission queues of the other apparatus contains at least one command; estimate, based on the indication, whether a first submission queue of the plurality of submission queues contains a plurality of commands having a defined execution order; and collectively fetch the plurality of commands from the first submission queue as a result of the estimation.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
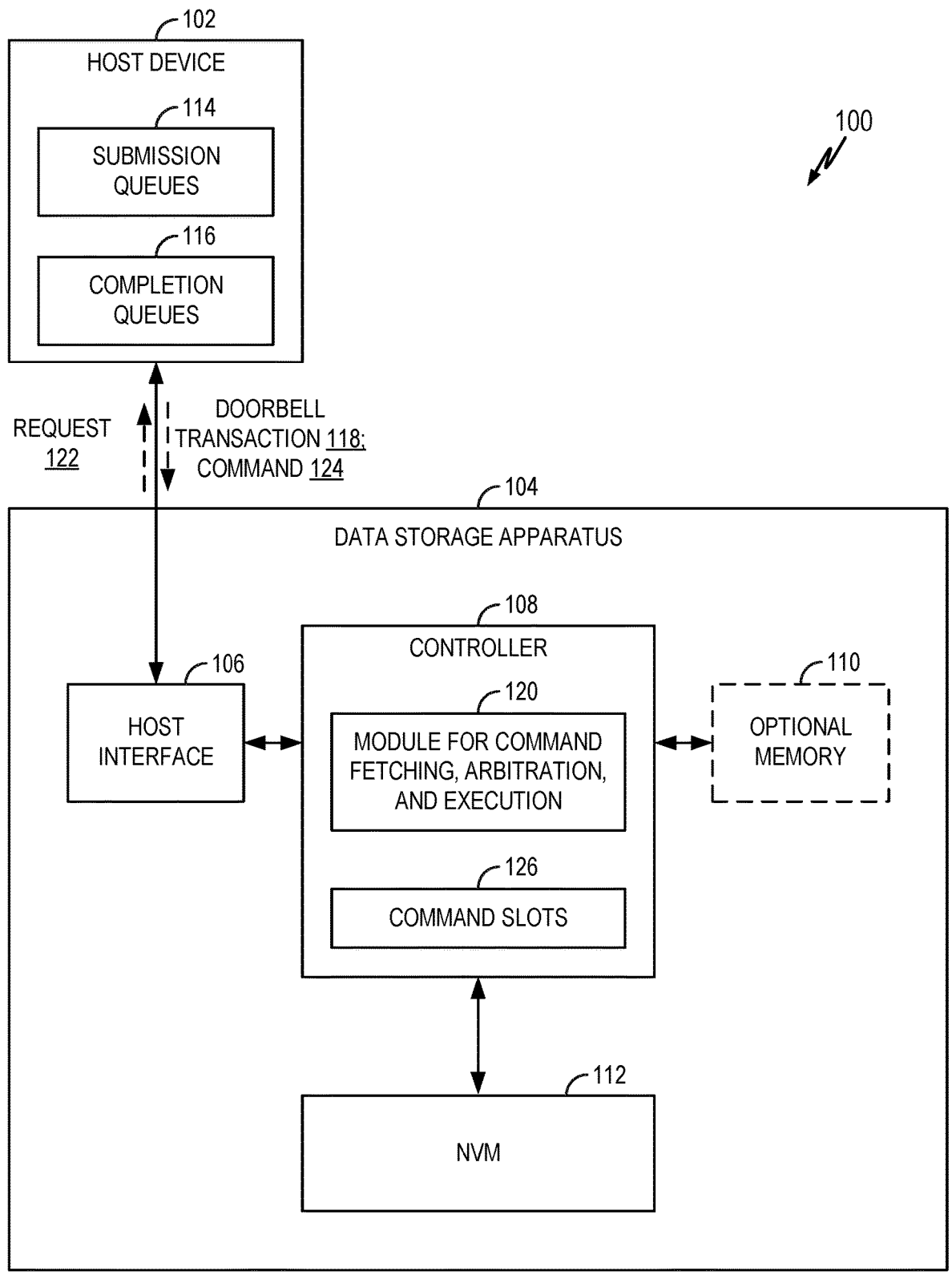
FIG. 1 illustrates an example memory system including a data storage apparatus configured in accordance with one or more aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The disclosure relates in some aspects to various apparatuses, systems, methods, and media for managing command fetching and execution by a data storage apparatus. For example, a data storage apparatus may determine whether execution of a command is blocked. If the execution is blocked, the data storage apparatus controls the execution of the command to prevent the blocked command from unduly preventing execution of other commands. For example, if the command will be blocked for more than a threshold period of time, the data storage apparatus may free up a command memory location (e.g., a command slot) currently allocated for the command and take action to execute the command at a later point in time. In this way, the freed-up command memory location may be used to execute another command (e.g., another type of command). As another example, a data storage apparatus may estimate (e.g., predict) whether a particular submission queue contains commands that require a particular execution order. Upon determining (e.g., estimating) that the submission queue likely contains such commands, the data storage apparatus collectively fetches the commands (e.g., at the same time or in succession) so that the data storage apparatus can execute the commands according to the prescribed execution order.

For purposes of illustration, various aspects of the disclosure will be described in the context of a memory system that includes NAND memory technology. A NAND device may be referred to herein as a NAND Flash memory, a NAND memory device, a NAND flash, or a NAND. Generally speaking, a NAND device is a non-volatile memory having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), and the like. NAND devices may be configured as discrete memory chips or packaged with a controller to form a secure digital (SD) memory card, Multi Media Card (MMC), or a solid state disk. A NAND device may be configured with a single flash die, or a plurality of dies. In addition to memory cells, a NAND device may include other components, such as control/address logic components, I/O components, and data register components. It should be appreciated that the teachings herein are also applicable to other forms of memory (e.g., NVM other than NAND devices).

Example Memory System

FIG. 1 illustrates an embodiment of a memory system 100 that includes a host device 102 and data storage apparatus 104 communicatively coupled to the host device 102. In some embodiments, the data storage apparatus 104 may be a solid state device (SSD). In some embodiments, an SSD may be a solid state drive.

The host device (e.g., a host computer) 102 provides commands to the data storage apparatus 104 for transferring data between the host device 102 and the data storage apparatus 104. For example, the host device 102 may provide a write command to the data storage apparatus 104 for writing data to the data storage apparatus 104 or a read command to the data storage apparatus 104 for reading data from the data storage apparatus 104. The host device 102 may be any system or device having a need for data storage or retrieval and a compatible interface for communicating with the data storage apparatus 104. For example, the host device 102 may a computing device, a personal computer, a portable computer, or workstation, a server, a personal digital assistant, a digital camera, a digital phone, or the like.

The data storage apparatus 104 includes a host interface 106, a controller 108, an optional memory 110, and a non-volatile memory (NVM) 112. The host interface 106 is coupled to the controller 108 and facilitates communication between the host device 102 and the controller 108. Additionally, the controller 108 is coupled to the memory 110 and the NVM 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host device 102 includes the data storage apparatus 104 (e.g., the host device 102 and the data storage apparatus 104 are implemented as a single component). In other embodiments, the data storage apparatus 104 is remote with respect to the host device 102 or is contained in a remote computing system coupled in communication with the host device 102. For example, the host device 102 may communicate with the data storage apparatus 104 through a wireless communication link.

The controller 108 controls operation of the data storage apparatus 104. In various embodiments, the controller 108 receives commands 114 from the host device 102 through the host interface 106 and performs the commands to transfer data 116 between the host device 102 and the NVM 112. In addition, the controller 108 performs internal operations such as garbage collection operations, data integrity operations, and wear leveling operations. The controller 108 may include any type of processing device, such as a microprocessor, a microcontroller, an embedded controller, a logic circuit, software, firmware, or the like, for controlling operation of the data storage apparatus 104.

In some embodiments, some or all of the functions described herein as being performed by the controller 108 may instead be performed by another element of the data storage apparatus 104. For example, the data storage apparatus 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host device 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host device 102 and the NVM 112. For example, the memory 110 or a portion of the memory 110 may be a cache memory.

The host device 102 includes submission queues 114 for storing commands to be fetched and executed by the data storage apparatus 104. The host device 102 also includes completion queues 116 for storing information received from the data storage apparatus 104 regarding successful or unsuccessful execution of the commands. After queueing one or more commands in one of the submission queues 114, the host device 102 initiates a so-called doorbell transaction 118 to inform the data storage apparatus 102 that one or more commands are queued in that submission queue. For example, the doorbell transaction 118 may write to a memory location (e.g., an NVMe register) in the data storage apparatus 104, setting bits that indicate that a particular submission queue contains at least one command and the number of commands queued in that submission queue.

The controller 108 includes a module (e.g., hardware and/or software) for command fetching, arbitration, and execution 120. The controller 108 also includes commands slots 126 (e.g. buffers, registers, etc.) that are used to temporarily store commands (and, optionally, associated information) to be executed by the controller 108.

The module for command fetching, arbitration, and execution 120 controls how commands are fetched from the submission queues 114 and controls how the commands are executed by the controller 108. For example, in response to a doorbell transaction 118, the module for command fetching, arbitration, and execution 120 may issue a request 122 to read the submission queue identified by the doorbell transaction 118. In response to the request, the host device 102 sends the corresponding command 124 (and associated information, if applicable) to the data storage apparatus 104.

The module for command fetching, arbitration, and execution 120 may then place the command 124 into one of the command slots 126 of the controller 108 and the controller 108 executes the command from the command slot. For example, a command to be executed and associated information (e.g., host pointers for the command) may be parsed (e.g., by logic of the controller 108) and loaded into a particular command slot. As execution resources of the controller 108 are freed-up (e.g., execution of another command is completed), the controller 108 will execute one of the commands from one of the command slots 126.

In the event the module for command fetching, arbitration, and execution 120 determines that execution of the command 124 is blocked at the controller 108, the module for command fetching, arbitration, and execution 120 may control execution of the command 124 to ensure that the command 124 does not occupy a command slot for too long. For example, only some types of commands (e.g., write commands) may be blocked at a given point in time. Thus, the module for command fetching, arbitration, and execution 120 may free-up a command slot holding a blocked command if the command will not be executed in the near future. In this way, other types of commands (e.g., read commands) that can be executed at this time can be loaded into the freed-up command slot, thereby more efficiently using the resources of the data storage apparatus 104.

The module for command fetching, arbitration, and execution 120 may also proactively fetch multiple commands from a submission queue. For example, some commands may need to be executed in a defined order (e.g., commands may need to be executed successively such that no other command is executed between the execution of these commands). A FUSED command defined for NVMe is one example of this type of controlled execution command. The host device 102 does not tell the data storage device 104 which type of commands are stored in the submission queues 114. Thus, in accordance with the teachings herein, the module for command fetching, arbitration, and execution 120 predicts whether a particular submission queue contains a plurality of commands with controlled execution (e.g., a FUSED command). If it is likely that the submission queue contains such a plurality of commands, the module for command fetching, arbitration, and execution 120 collectively fetches the commands from the submission queue and places the commands in command slots to enable the controller 108 to execute the commands in succession. For example, the module for command fetching, arbitration, and execution 120 may request that the host device 104 send all of the commands together, or the module for command fetching, arbitration, and execution 120 may successively fetch the commands from the submission queues (e.g., with no other intervening fetches).

Example NVMe Architecture

Figure 2:
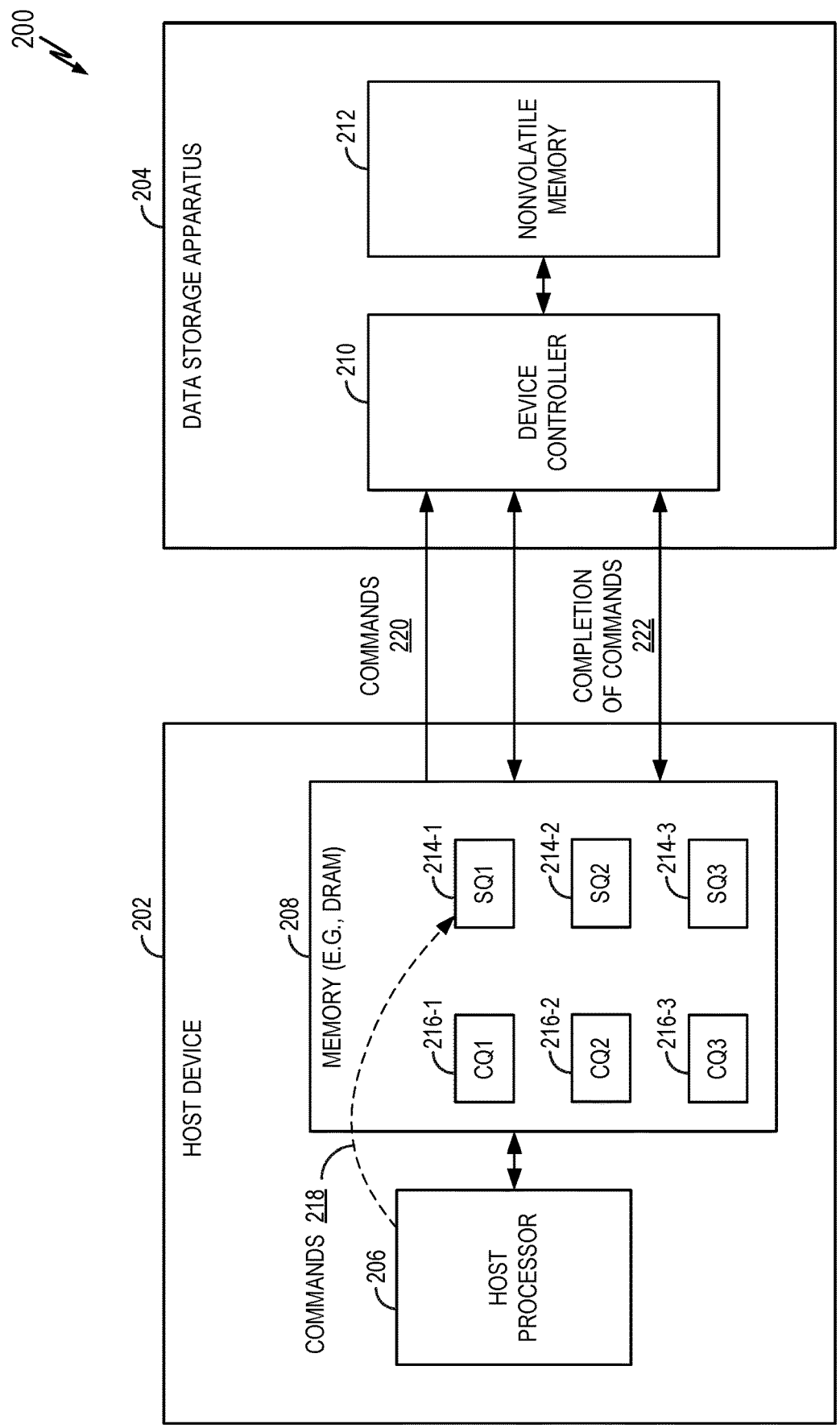
FIG. 2 illustrates an example of a host device and a data storage apparatus according to the NVMe architecture.

FIG. 2 illustrates an example of an NVMe architecture 200 in which the subject matter described herein may be implemented. According to the NVMe standard, a host device 202 communicates memory device commands, such as read commands, write commands, and admin commands, to a data storage apparatus 204 (e.g., with nonvolatile storage) using submission queues.

The host device 202 may be any suitable computing platform that is capable of accessing memory on a storage device. For example, host device 202 may be a desktop personal computer, a laptop computer, a tablet computer, a mobile telephone, or a front end to a storage array. The host device 202 includes a host processor 206 and a memory 208 (e.g., DRAM). The host device 202 may store data in the data storage apparatus 204.

The data storage apparatus 204 may be any suitable device that provides nonvolatile memory storage for the host device 202. The data storage apparatus 204 may be a removable storage device, such as a solid state drive (e.g., that is removably connectable to host device 202). In an alternate example, the data storage apparatus 204 may be non-removable or integrated within host device 202.

In the example of FIG. 2, the data storage apparatus 204 includes a device controller 210 and a nonvolatile memory 212. The device controller 210 controls access to nonvolatile memory 212. In one embodiment, the device controller 210 may be a nonvolatile memory controller that implements or supports the NVMe protocol, and the nonvolatile memory 212 may be 2D or 3D NAND flash memory.

To read data from or write data to the data storage apparatus 204, the host processor 206 generates commands and stores the commands in submission queues 214-1, 214-2, and 214-3. Three submission queues are shown for illustrative purposes. It is understood that there may be more or fewer than three submission queues at any given time depending on NVMe device usage by the host system. The device controller 210 fetches the commands from the submission queues 214-1, 214-2, and 214-3 and then executes the commands. Upon completion of the commands, the device controller 210 writes completion entries to completion queues 216-1, 216-2, and 216-3.

The NVMe standard defines three arbitration techniques for etching commands from the submission queues. The first technique uses round-robin arbitration and is mandatory. The second technique uses weighted round-robin with urgent priority class command arbitration and is optional. The last technique is vendor-specific.

In the round-robin arbitration technique, the data storage apparatus provides round-robin command arbitration amongst all submission queues, including an admin submission queue. In this case, all of the submission queues are treated with equal priority. The data storage apparatus may select multiple candidate commands for processing from each submission queue per round based on an arbitration burst setting.

Figure 3:
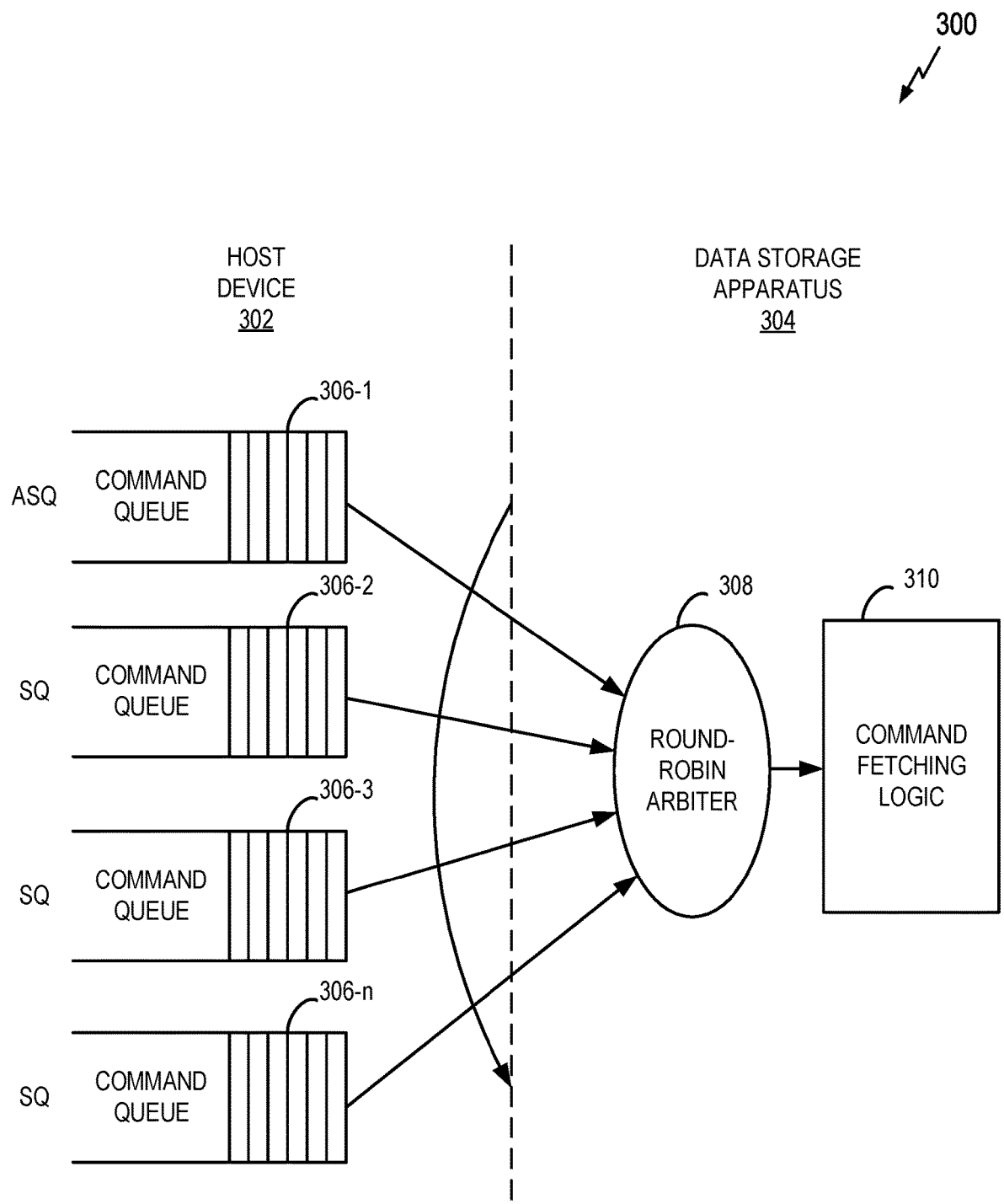
FIG. 3 illustrates an example of a round-robin command fetching according to the NVMe standard.

FIG. 3 illustrates a communication system 300 including a host device 302 and a data storage apparatus 304 where a round-robin technique is used for selecting or fetching commands from submission queues (SQs) 306-1-306-N. A round-robin arbiter 308 statically selects a command from one of the submission queues 306-1-306-N based on a round-robin selection algorithm regardless of device state, the status of the corresponding completion queues, or any other information. The round-robin selection involves selecting from each queue 306-1-306-N in order from 1 to N and continually repeating the selection in the same order. The round-robin arbiter 308 instructs command fetching logic 310 to select each command. The command fetching logic 310 provides the command to command processing logic (not shown in FIG. 3) that processes the command. While round-robin selection can ensure equal serving of submission queues, storage device resources might not be optimally utilized, especially when commands from the submission queues are fetched but cannot be processed due to storage device resource constraints. For example, if the data storage apparatus 304 is unable to process a write command fetched from a submission queue, the data storage apparatus 304 may wait until resources are available to process the write command. If the data storage apparatus 304 processing resources for processing a read command were available but not used during the wait period, then such resources are not being efficiently utilized.

In the weighted round-robin with urgent priority class command arbitration technique, there are three strict priority classes and three weighted round robin priority levels. If submission queue A is of higher strict priority than submission queue B, then all candidate commands in submission queue A will start processing before candidate commands from submission Queue B start processing.

The highest strict priority class is the admin class that includes any command submitted to the admin submission queue. This class has the highest strict priority above commands submitted to any other submission queue.

The next highest strict priority class is the urgent class. Any I/O submission queue assigned to the urgent priority class is serviced next after commands submitted to the admin submission queue, and before any commands submitted to a weighted round robin priority level. In general, host device software will use care in assigning any submission queue to the urgent priority class since there is the potential to starve I/O submission queues in the weighted round robin priority levels as there is no fairness protocol between the urgent and non-urgent I/O submission queues.

The lowest strict priority class is the weighed round robin class. This class consists of the three weighted round robin priority levels (high, medium, and low) that share the remaining bandwidth using weighted round robin arbitration. The host device software controls the weights for the high, medium, and low service classes via set features. Round robin is used to arbitrate within multiple submission queues assigned to the same weighted round robin level. The number of candidate commands that may start processing from each submission queue per round is either the arbitration burst setting or the remaining weighted round robin credits, whichever is smaller.

Figure 4:
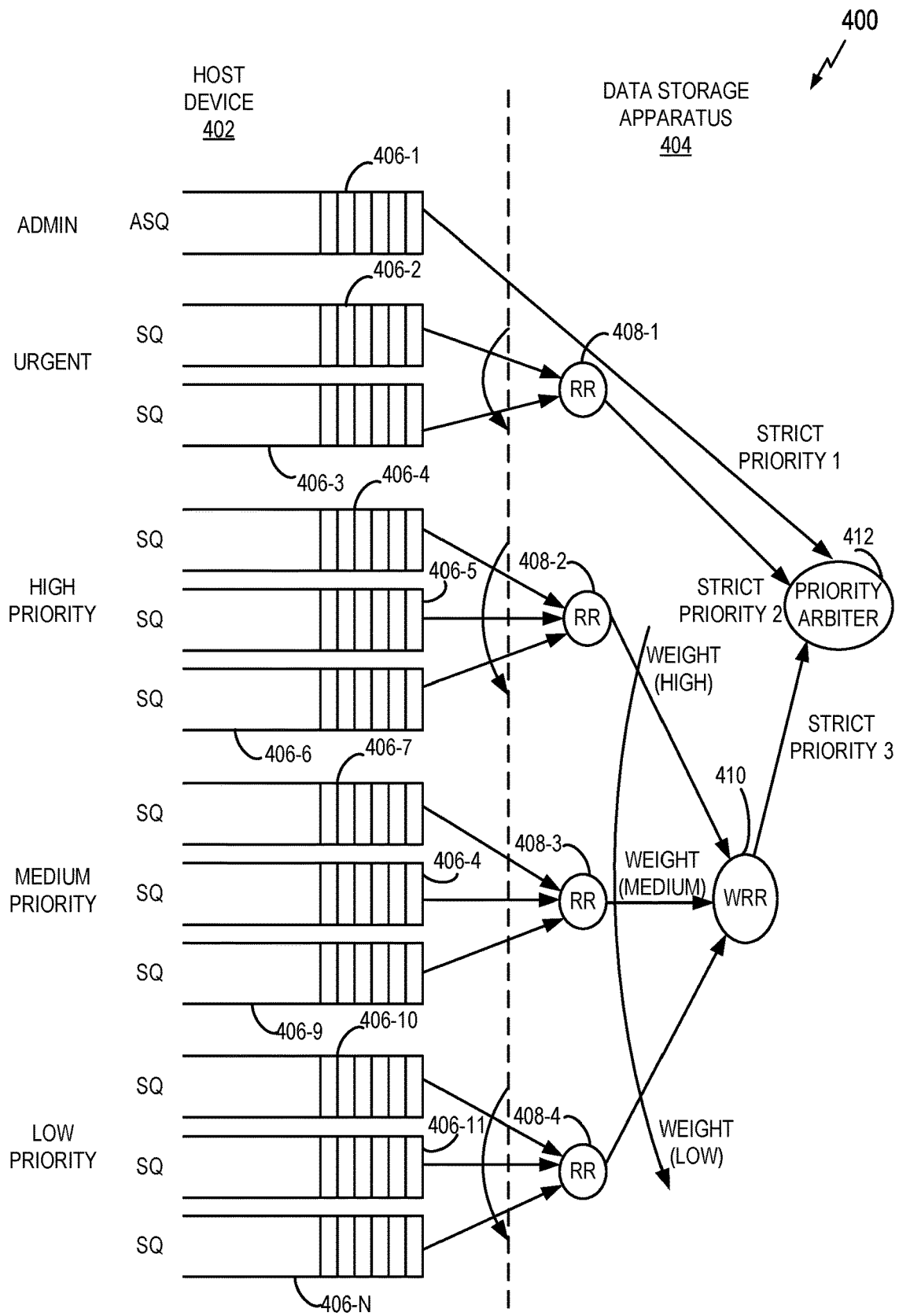
FIG. 4 illustrates an example of weighted round-robin command scheduling according to the NVMe standard.

FIG. 4 illustrates a communication system 400 including a host device 402 and a data storage apparatus 404 where a weighted round-robin technique is used for selecting or fetching commands from submission queues (SQs) 406-1-406-N. The submission queues 406-1-406-N are grouped according to priorities. Round-robin arbiters (RRs) 408-1-408-N each implement round-robin selection for their respective queues and pass the selected queue to the next level in the hierarchy. A weighted round-robin arbiter (WRR) 410 selects commands from the candidates selected by round-robin arbiters 408-2-408-N at the previous level using assigned weights to order the candidates in each round of round-robin selection. The weighted round-robin arbiter 410 passes its selected queue as a selection candidate to the next level in the hierarchy, which is the highest level in this example. A priority arbiter 412 at the highest level in the hierarchy selects from the output of weighted round-robin arbiter 410, an admin queue 406-1, and the output of round-robin arbiter 406-1, using host assigned priorities. While the technique illustrated in FIG. 4 allows for prioritization of commands, the priorities are statically set by the host device 402. As a result, the data storage apparatus 404 may fetch commands that cannot be immediately processed while other commands that could be immediately processed remain queued in the submission queues 406-1-406-N.

The NVMe standard also supports so-called FUSED operations that enable use of a more complex command by "fusing" together two simpler commands. Conventionally, these commands are collectively referred to as a FUSED command.

In a FUSED operation, the commands are executed in sequence as an atomic unit. For example, the NVMe controller may ensure that no other operations are executed between these two commands.

The commands are inserted next to each other in the same submission queue. The submission queue tail doorbell pointer update indicates both commands as part of one doorbell update.

A compare and write is one example of a FUSED operation. This operation compares the contents of the logical block(s) specified in the compare command to the data stored at the indicated logical block address (LBA) range. If the compare is successful, then the LBA range is updated with the data provided in the write command. If the compare operation is not successful, then the write operation is aborted with a status of command aborted due to a failed FUSED command and the contents in the LBA range are not modified.

Enhanced NVMe Command Selection

In an NVMe system environment, host software places NVMe commands in submission queues allocated in host memory as discussed above. An NVMe controller in a data storage apparatus fetches the NVMe commands from the submission queues based on a queue priority.

In general, it is preferable to fetch the commands early enough so the overall performance can be increased (e.g., by avoiding command timeout at the host device). However, holding a command internally in the NVMe controller waiting to start the execution phase may waste expensive resources of the NVMe controller such as internal command slots, internal buffers, and associated logic. Moreover, holding unexecuted commands for a long period of time may lead to performance degradation since other commands that can be executed immediately could have used those resources. For example, when an NVMe controller fetches a command, a previously free command slot is occupied with the command while the command is pending for execution. If the NVMe controller cannot start the execution phase for the command at this point, this command slot is wasted and not fully utilized since during this period other commands might have used this slot. Thus, performance of not only of this specific command is adversely affected by the delayed execution, but the performance of other I/O commands may be adversely affected as well.

Moreover, using conventional techniques, an NVMe controller may be subjected to possible command execution deadlocks, especially for FUSED command operations. The NVMe controller architecture is optimized for normal operations, not FUSED command operations. After fetching the first part (e.g., a first command) of a FUSED command, the corresponding command is held internally (occupying a command slot) until the second part (e.g., second command) of the FUSED command is fetched. Only when the NVMe controller has both parts of the FUSED commands will the NVMe controller start the execution phase for this FUSED command. Thus, holding the first part of a FUSED command internally in the NVMe controller while waiting to start the execution phase may waste expensive resources of the NVMe controller. If the maximum number of outstanding commands in the NVMe controller is less than the maximum number of supported submission queues, deadlock may occur in the case where when all submission queues have FUSED commands.

The disclosure relates in some aspects to managing the above trade-offs by providing better command utilization and better utilization of internal resources. For example, after fetching a command, but before allocating a command slot for this command, the NVMe controller checks whether the command is blocked by at least one event (e.g., an internal event and/or an external event). When command execution is blocked by an internal event, the NVMe controller determines when the blocking will be removed. If the blocking will not be removed for a relatively long period of time, the NVMe controller may store this command internally in DRAM or host device memory (e.g., a host memory buffer (HMB)) the release the command slot until the blocking is removed.

In some implementations, the NVMe controller compares the remaining blocking duration (e.g., the amount of time that execution of the command will be delayed) with a threshold to determine whether a blocking condition is indicated. This threshold may be defined, for example, based on one or more of: the maximum number of commands that can be stored for execution (e.g., in the NVMe controller or other suitable device), the number of commands that are stored for execution that are currently blocked, the amount of time that it takes to execute commands, or other execution-related information. This threshold may be defined, for example, based on empirical testing and/or simulation to identify a threshold period of time that provides the best performance. Different thresholds may be used in some implementations (e.g., different thresholds for different commands). In some implementations, a threshold on the order of 10-20 microseconds may be used. Other threshold values may be used in other implementations.

An LBA collision is one example of an internal blocking condition. For example, if the host device issues a read for data that is current cached in DRAM, the controller may need to flush the DRAM and write the data back to the NAND device (e.g., the controller might not be able to return data directly from the DRAM to the host device). Thus, the controller will not be able to start the execution phase for the read operation immediately, thereby resulting in a temporary blocking condition.

Another example of an internal blocking condition relates to commands associated with a specific name space (e.g., a group of LBAs). The commands in a name space may share the same attributes (e.g., security zone, LBA size, quality of service (QoS), etc.). If a name space is currently saturated, the controller may temporarily stop execution of all commands for that name space (e.g., to maintain consistent service (e.g., QoS) for all commands of the name space). Thus, execution of these commands may be temporarily blocked.

Execution of a defined execution order command is one example of an external blocking condition. For example, if the controller has loaded only the first part of a FUSED command into a command slot, the controller need to wait to receive the second part of the FUSED command before executing the first part of the FUSED command. Thus, execution of the first part of the FUSED command is blocked in this case due to the execution order requirement externally imposed by the host device.

As mentioned above, the NVMe controller architecture is optimized for non-FUSED operations. The disclosure relates in some aspects to optimizing NVMe FUSED operations. These optimizations may include optimization of internal resources used for FUSED command execution such as SRAM, NVMe command slots, internal flops, etc. These optimizations may include avoiding deadlocks while executing FUSED commands. These optimizations may include intelligent NVMe arbitration which takes into account FUSED operations. These optimizations may include queueing both parts of a FUSED command to NVMe controller firmware as single entry so that the firmware can start the execution as soon as the entry is received without any extra flows. These optimizations may include NVMe FUSED command rule verification required by the NVMe controller.

As an example of the above optimizations, when command execution is blocked by an external event (such as having fetched only the first command of a FUSED command), the NVMe controller may either shorten the blocking period (e.g., by increasing the priority of the submission queue) or release the command slot and execute the FUSED command at a later time. In a first embodiment, after fetching the first part of a FUSED command, the priority of the relevant submission queue is increased so that the second part of the FUSED command will be fetched as soon as possible. In a second embodiment, the first part of the FUSED command is dropped while setting an indication that this submission queue holds a FUSED command. In the next round of the command fetching arbitration, since the NVMe controller knows that this submission queue holds a FUSED command, the NVMe controller fetches both parts of the FUSED command (e.g., in one fetch operation). In a third embodiment, the NVMe controller predicts when a submission queue holds a FUSED command and fetches the commands of the FUSED command as a single unit. This prediction is based, at least in part, on the way the host device does the doorbell transactions. Any of these embodiments may work in parallel.

The disclosure thus relates in some aspects to reducing the amount of time that a command that cannot be executed immediately is held internally (e.g., in an NVMe controller). These aspects and other aspects of the disclosure will now be described in more detail in conjunction with the operations for controlling command execution set forth in FIGS. 5-9. All of the disclosed embodiments can work in parallel while switching dynamically among them.

Example Command Execution Control Operations

Figure 5:
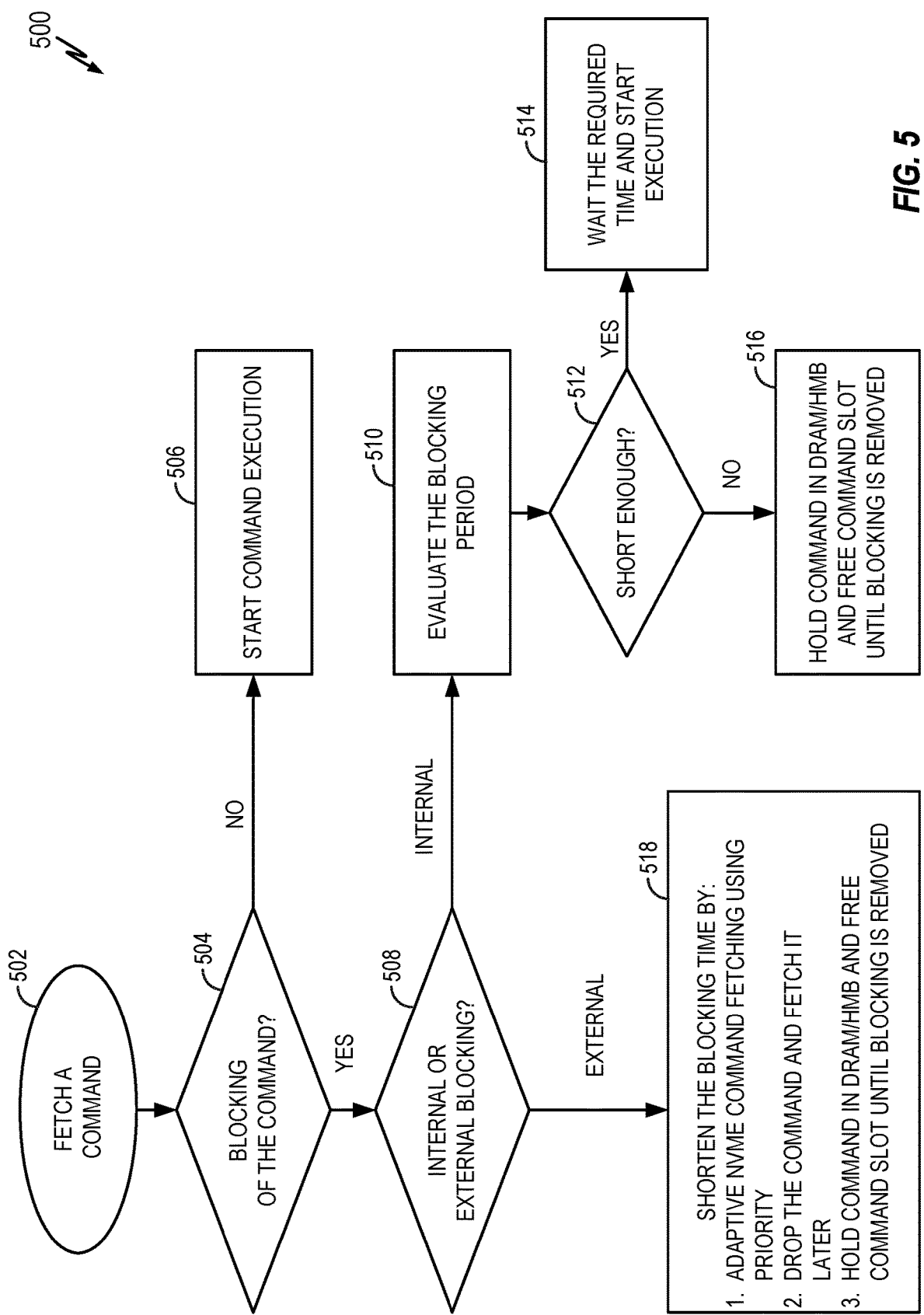
FIG. 5 illustrates an example of operations for controlling command execution in the event of internal blocking and/or or external blocking in accordance with one or more aspects of the disclosure.

FIG. 5 illustrates an embodiment of operations 500 that may be performed in conjunction with controlling command execution in accordance with the teachings herein. The operations 500 may take place within a data storage apparatus, a host device, an NVM device, or some other suitable apparatus or apparatuses. For example, one or more of these operations may be performed by the controller 108 (e.g., the module for command fetching, arbitration, and execution 120) of FIG. 1.

At block 502, a data storage apparatus (or other suitable apparatus) fetches a command. For example, the data storage apparatus may fetch a command from a submission queue of a host device in response to a doorbell transaction.

At block 504, before allocating a command slot for this command, the data storage apparatus determined whether the command is blocked by one or more conditions. Such a condition could relate to a condition internal to the data storage apparatus (an internal event) or a condition external to the data storage apparatus (an external event). For example, internal conditions may include one or more of a lack of internal resources, a NAND being busy with internal management, or LBA overlaps. External conditions may include the scenario where the data storage apparatus has fetched only one part of a FUSED command.

If the command is not blocked (e.g., the execution phase for the command can start immediately), at block 506 the data storage apparatus starts the execution of the command.

If the command is blocked, at block 508 the data storage apparatus determines whether the blocking is due to an internal condition or an external condition.

If the blocking is due to an internal condition, at block 510 the data storage apparatus evaluates the blocking period to determine when the blocking will be removed.

At block 512, if the blocking period is relatively short (e.g., less than a threshold amount of time), the operation flow proceeds to block 514.

At block 514, the data storage apparatus waits until the command execution is no longer blocked and then starts the execution of the command.

If it is determined at block 512 that the blocking period is too long (e.g., greater than a threshold amount of time), at block 516 the data storage apparatus holds this command internally in memory (e.g., DRAM or HMB) and, if applicable, releases the command slot. Once the blocking is removed, the data storage apparatus copies the command information from the memory to a command slot and executes the command.

If it is determined at block 508 that the blocking is due to an external condition, at block 518 the data storage apparatus may shorten the blocking period using any of three techniques. In a first technique, the data storage apparatus changes the priority scheme of the command fetching (e.g., by increasing the priority of the submission queue that contains the FUSED command). In the second technique, the data storage apparatus drops the first part of the FUSED command and then fetches it at a later point in time with the other part of the FUSED command. In the third technique, the data storage apparatus holds the first part of the FUSED command internally in memory (e.g., DRAM or HMB) and, if applicable, releases the command slot. Once the blocking is removed (e.g., once the data storage device fetches the second part of the FUSED command), the data storage apparatus copies the command information from the memory to a command slot and executes the command.

The NVMe standard specifies that the data storage apparatus should make sure that the host device does not violate FUSED command rules while executing FUSED commands. One verification technique is to make sure both parts of a FUSED command were submitted in adjacent slots in the submission queue. This verification is relatively simple when using the techniques described herein since a FUSED command might be queued as a single entry to the data storage device firmware.

In some aspects, a process in accordance with the teachings herein may include any combination of the above operations.

Example Priority-Based Command Execution Control

Figure 6:
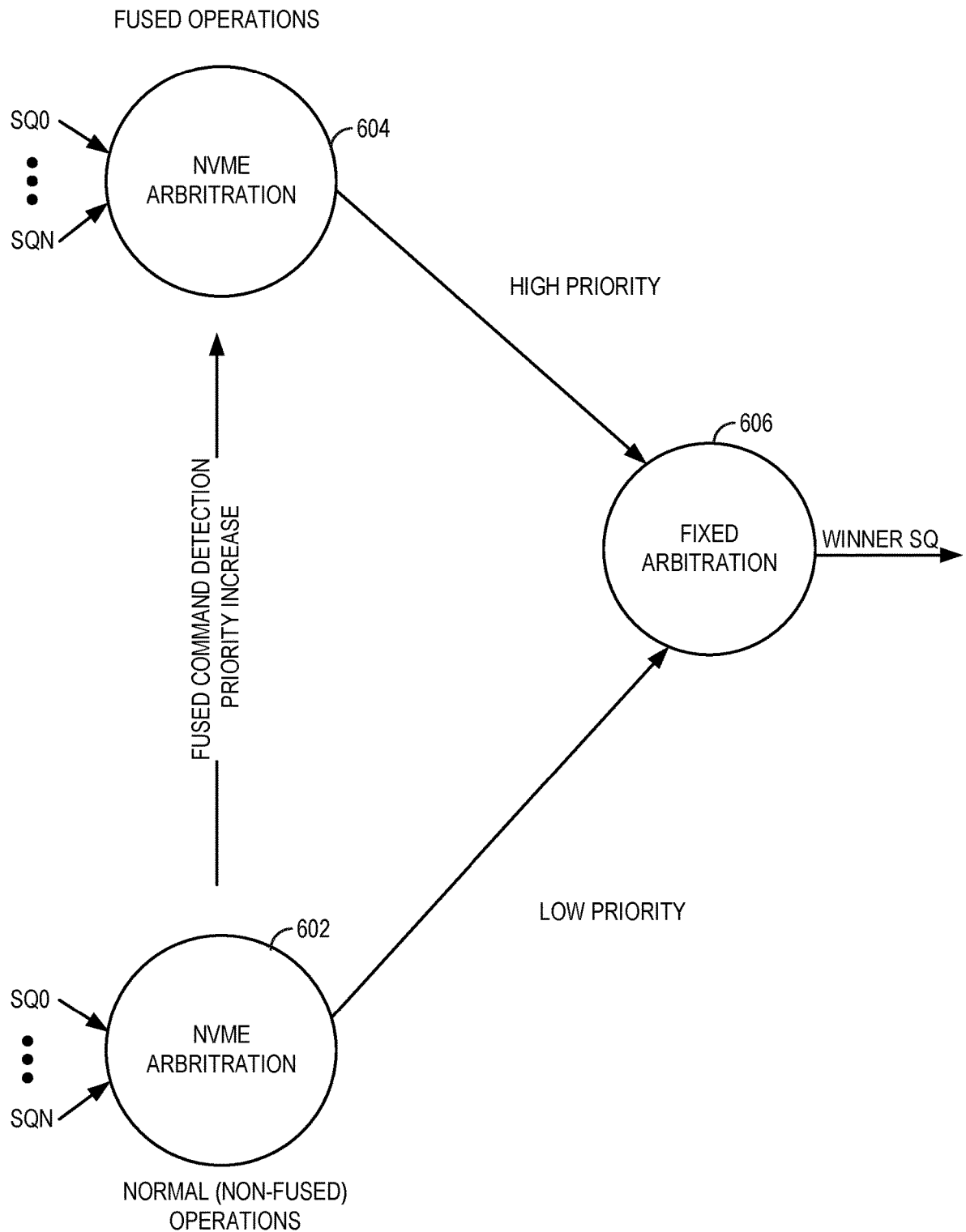
FIG. 6 illustrates an example of increasing the priority for a submission queue in accordance with one or more aspects of the disclosure.

FIG. 6 illustrates an example of priority levels used the first technique for mitigating external blocking described above. In the example of FIG. 6, an NVMe controller (not shown) implements two levels of NVMe submission queue arbitration logic for FUSED operations. A first NVMe arbitration level 602 is for the normal commands (non-FUSED commands) as defined in NVMe standard. A second NVMe arbitration level 604 has a higher priority and is for FUSED operations. In some implementations, the NVMe arbitration logic may be duplicated, where one set of NVMe arbitration logic is used for normal commands while the other set of NVMe arbitration logic is used for the second part of the FUSED command.

When the NVMe controller detects that only part of a FUSED command is held internally, the NVMe controller increases the priority of the relevant submission queue (from the first NVMe arbitration level 602 to the second NVMe arbitration level 604) so the second part of the FUSED command will be fetched as soon as possible.

For example, at the next round of arbitration, the submission queue selected by any arbitration for FUSED operations at the second NVMe arbitration level 604 will have higher priority than the submission queue selected by any arbitration for non-FUSED operations at the first NVMe arbitration level 602. Consequently, fixed arbitration logic 606 will select the higher priority submission queue for the FUSED operations as the submission queue to be accessed for this round of the arbitration.

Example Priority-Based Command Execution Control Operations

Figure 7:
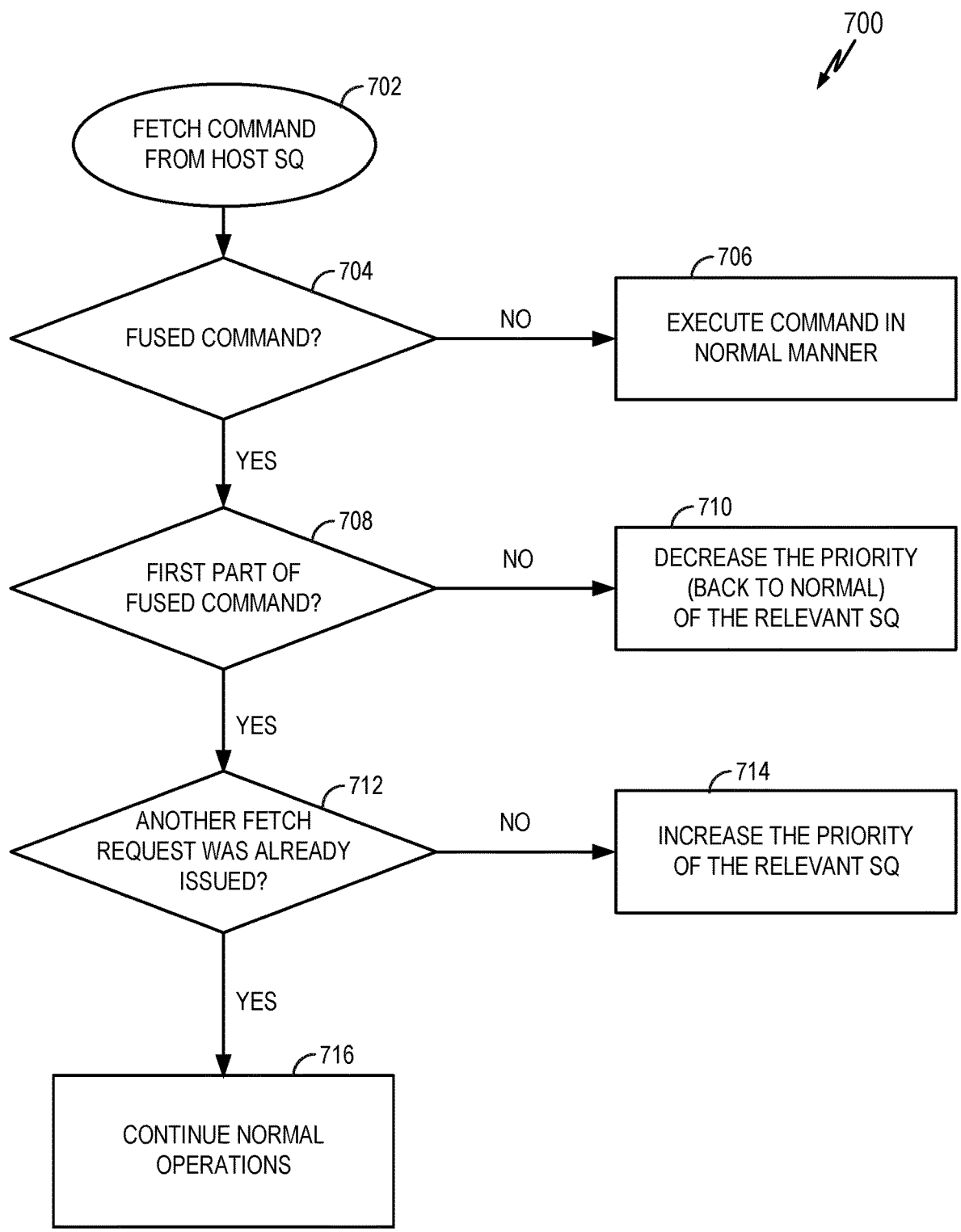
FIG. 7 illustrates an example of operations for controlling command execution in the event of external blocking in accordance with one or more aspects of the disclosure.

FIG. 7 illustrates an embodiment of operations 700 that may be performed in conjunction with the first technique for mitigating external blocking described above. The operations 700 may take place within a data storage apparatus, a host device, an NVM device, or some other suitable apparatus or apparatuses. For example, one or more of these operations may be performed by the controller 108 (e.g., the module for command fetching, arbitration, and execution 120) of FIG. 1.

At block 702, a data storage apparatus (or other suitable apparatus) fetches a command. For example, the data storage apparatus may fetch a command from a submission queue of a host device in response to a doorbell transaction.

At block 704, the data storage apparatus determines whether the command is a FUSED command.

If the command is not is a FUSED command (e.g., the execution phase for the command can start immediately), at block 706 the data storage apparatus executes the command in the normal manner.

If it is determined at block 704 that the command is a FUSED command, at block 708 the data storage apparatus determines whether the command is the first part of the FUSED command.

If the command is NOT the first part of the FUSED command (e.g., the command is the second part of the FUSED command), at block 710 the data storage apparatus changes the priority of the corresponding submission queue based to normal. For example, the priority of this submission queue would have been increased during a prior arbitration round when the first part of the FUSED command was fetched. Thus, the operations of block 710 decrease the priority of this submission queue back to normal. These operations may be done immediately after sending the relevant fetch request to the host device and before getting the command.

If it is determined at block 708 that the command is the first part of the FUSED command, at block 712 the data storage apparatus determines whether another fetch request was already issued to the relevant submission queue.

At block 714, if no further fetch requests were posted to this submission queue, the priority of this submission queue is increased so the second part of this FUSED command will be fetched as soon as possible.

At block 716, if another fetch request was already issued to the relevant submission queue, the data storage apparatus continues with normal operations. That is, the command is executed in the normal manner.

In some aspects, a process in accordance with the teachings herein may include any combination of the above operations.

Example Retry-Based Command Execution Control Operations

Figure 8:
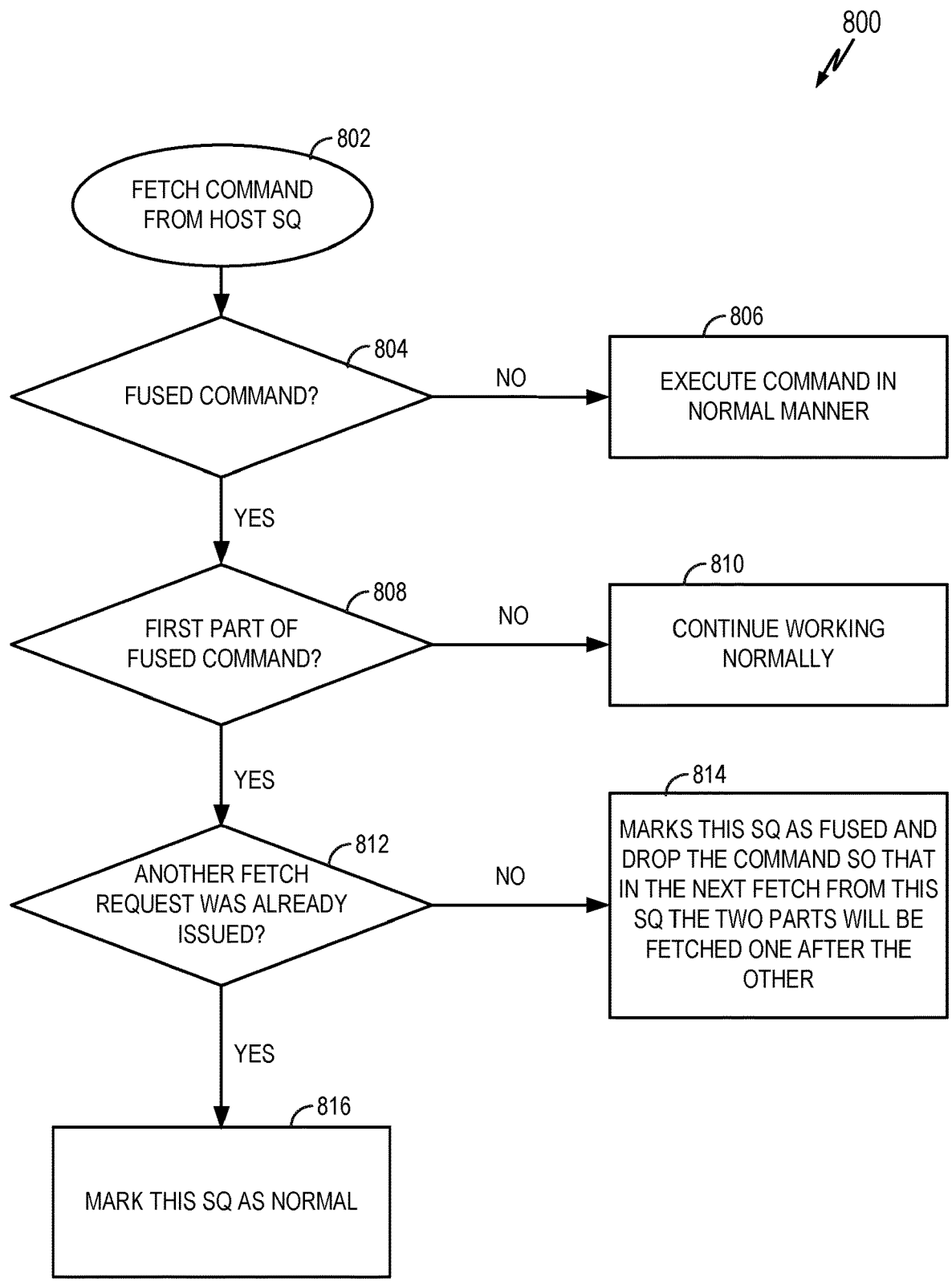
FIG. 8 illustrates another example of operations for controlling command execution in the event of external blocking in accordance with one or more aspects of the disclosure.

FIG. 8 illustrates an embodiment of operations 800 that may be performed in conjunction with the second technique for mitigating external blocking described above. The operations 800 may take place within a data storage apparatus, a host device, an NVM device, or some other suitable apparatus or apparatuses. For example, one or more of these operations may be performed by the controller 108 (e.g., the module for command fetching, arbitration, and execution 120) of FIG. 1.

At block 802, a data storage apparatus (or other suitable apparatus) fetches a command. For example, the data storage apparatus may fetch a command from a submission queue of a host device in response to a doorbell transaction.

At block 804, the data storage apparatus determines whether the command is a FUSED command.

If the command is not is a FUSED command (e.g., the execution phase for the command can start immediately), at block 806 the data storage apparatus executes the command in the normal manner.

If it is determined at block 804 that the command is a FUSED command, at block 808 the data storage apparatus determines whether the command is the first part of the FUSED command that was fetched alone (e.g., in a single fetch command).

If the command is NOT the first part of the FUSED command that was fetched alone, at block 810 the data storage apparatus processes the command in the normal manner. For example, if the associated fetch request asked for the two commands in a single PCIe packet, the second FUSED command will come in the next few hardware cycles. In this case, the data storage apparatus simply can execute the command as it normally would. As another example, the command may be the second part of the FUSED command. In this case, the data storage apparatus may successively execute the previously fetched first part of the FUSED command and the second part of the FUSED command.

If it is determined at block 808 that the command is the first part of the FUSED command that was fetched alone, at block 812 the data storage apparatus determines whether another fetch request was already issued to the relevant submission queue.

At block 814, if no further fetch requests were posted to this submission queue, the command is dropped while marking this submission queue as containing a FUSED command. In the next round of the NVMe arbitration logic, the data storage device knows that the next command in this submission queue is a FUSED command and fetches at least two commands from this submission queue one after one. This may be done, for example, using a single request to host device memory or using two read requests one after the other.

At block 816, if another fetch request was already issued to the relevant submission queue, the data storage apparatus marks this submission queue as normal. This resets any marking of the submission queue as containing a FUSED command that may have occurred at block 814 during a previous arbitration round.

In some aspects, a process in accordance with the teachings herein may include any combination of the above operations.

Example Prediction-Based Command Fetching Operations

Figure 9:
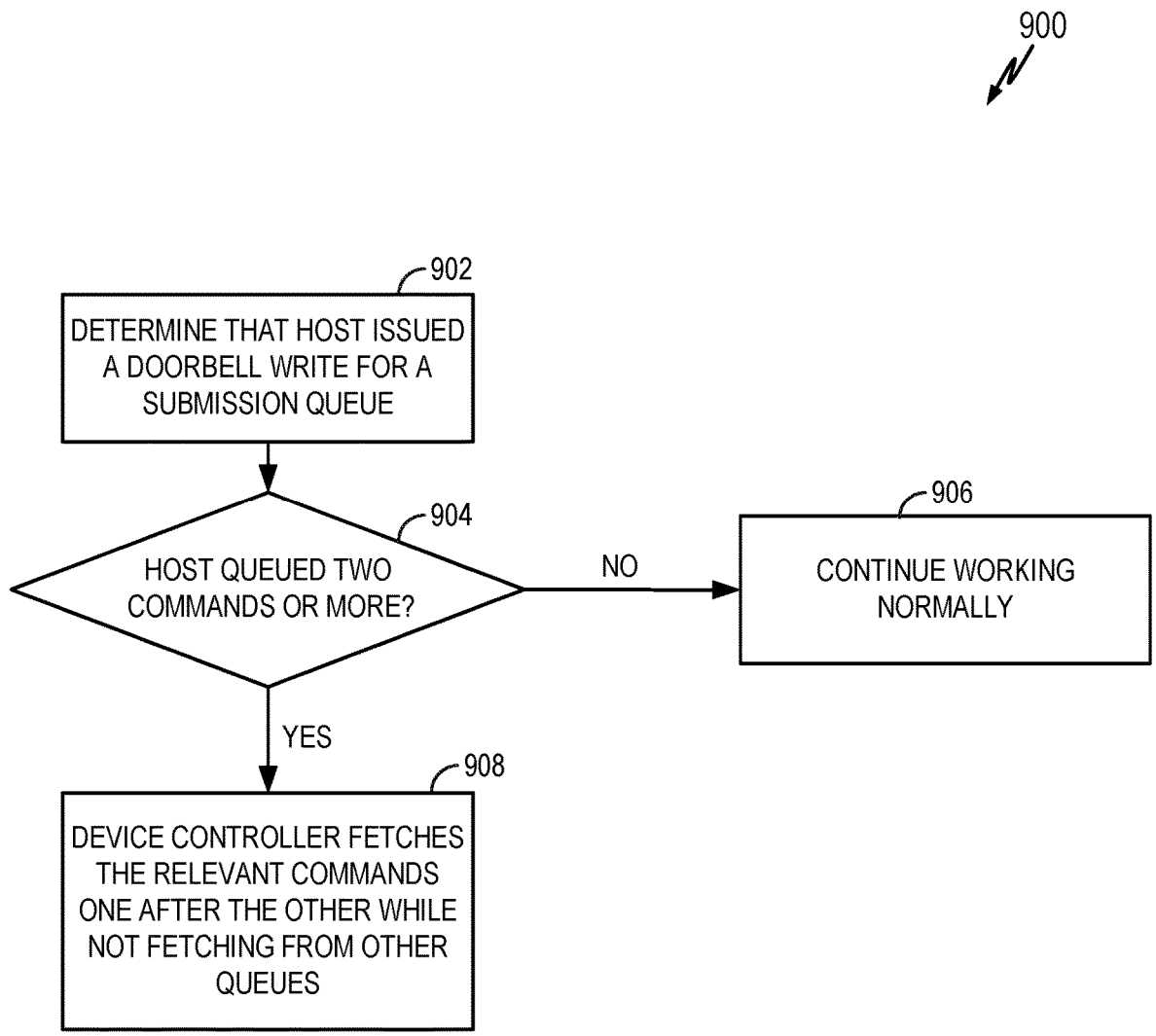
FIG. 9 illustrates an example of operations for controlling command fetching in the event of external blocking in accordance with one or more aspects of the disclosure.

FIG. 9 illustrates an embodiment of operations 900 that may be performed in conjunction with predicting whether a submission queue contains a FUSED command as described above. The operations 900 may take place within a data storage apparatus, a host device, an NVM device, or some other suitable apparatus or apparatuses. For example, one or more of these operations may be performed by the controller 108 (e.g., the module for command fetching, arbitration, and execution 120) of FIG. 1.

At block 902, a data storage apparatus (or other suitable apparatus) determines that a host device issues a doorbell write for a submission queue.

At block 904, the data storage apparatus determines whether the host device queued two or more commands in the submission queue.

If the host device did not queue two or more commands, at block 906 the data storage apparatus processes the command in the submission queue in the normal manner.

If it is determined at block 904 that the host device did queue two or more commands, at block 908 the data storage apparatus fetches all of the commands in the submission queue one after the other, without fetching from any other submission queue in the interim.

Thus, the data storage apparatus predicts when there is a FUSED command based on the way the host device writes to the doorbell register. According to the NVMe standard, the doorbell for FUSED commands must be written using a single transaction. The data storage apparatus detects that a doorbell transaction indicates that a submission queue holds multiple commands. In this case, the data storage apparatus tries to fetch all commands (e.g., one after the other) that were updated by a single doorbell access. In this way, the data storage apparatus may be able to fetch all of the parts of a FUSED command one after the other while not fetching any other commands between them.

In some embodiments, the data storage apparatus may monitor doorbell transactions to identify any submission queues into which the host device tends to write FUSED commands. In this case, the data storage apparatus may include logic that captures the host device submission queue doorbell write transactions over time. Based on this information, the submission queues that are likely to contain a FUSED command are identified. For example, the logic may generate an estimate (e.g., based on collected doorbell statistics) of whether a submission queue contains a FUSED command based on how frequently the host device queued FUSED commands in that submission queue.

Thus, a decision regarding whether to fetch multiple commands from a submission queue (e.g., at block 906) may be based on: 1) whether the host device queues two or more commands in that submission queue (e.g., as determined at block 904); and/or 2) an estimate (e.g., based on collected statistics) regarding whether the submission queue is likely to contain a FUSED command.

In some aspects, a process in accordance with the teachings herein may include any combination of the above operations.

Example Fetching and Execution Components

Figure 10:
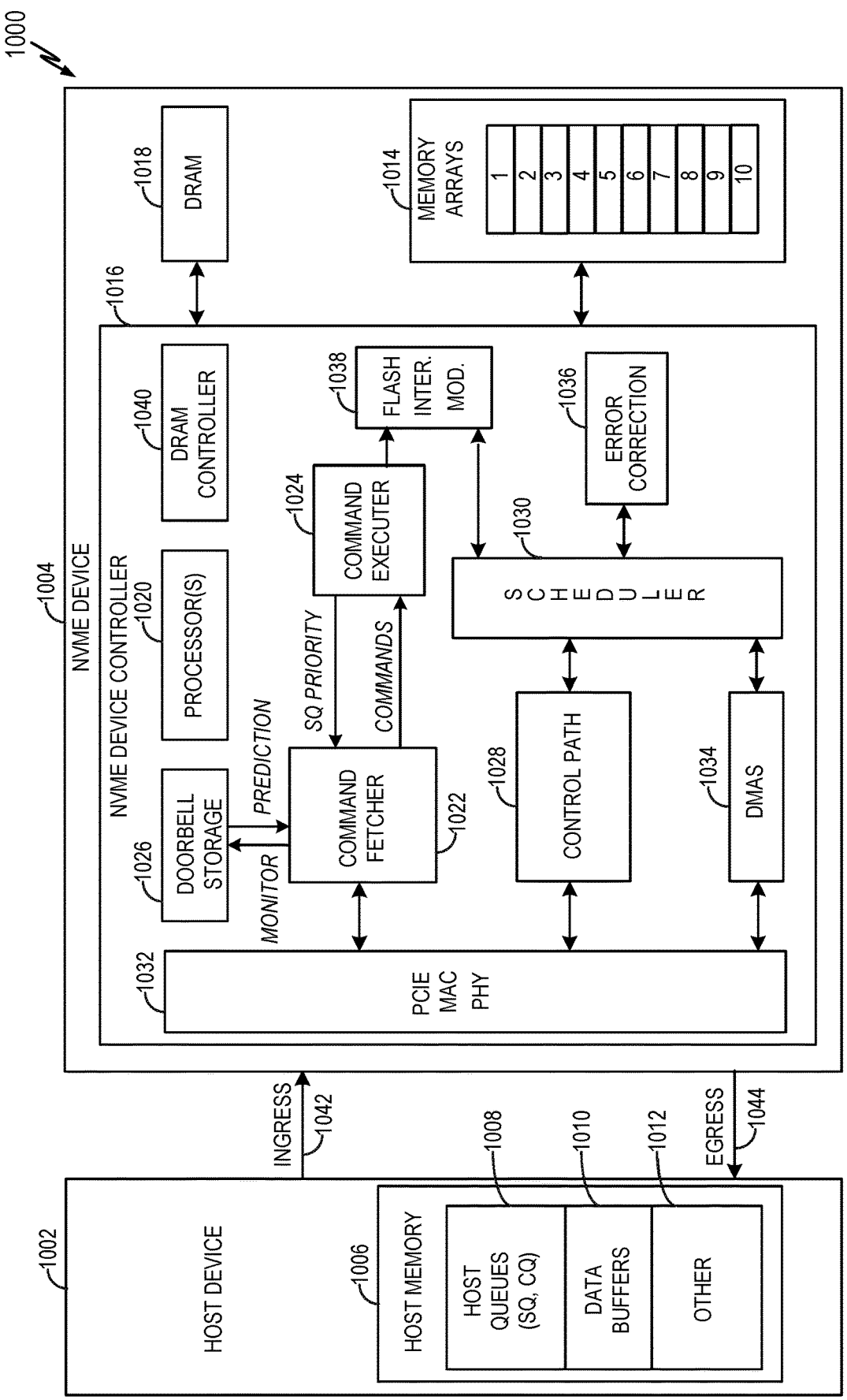
FIG. 10 illustrates an example of a host device and an NVMe device in accordance with one or more aspects of the disclosure.

FIG. 10 illustrates an example of a memory system 1000 that incorporates command fetching and execution as taught herein. In the example of FIG. 10, the memory system 1000 is an NVMe system. However, the teachings herein are applicable to other types of systems. The memory system 1000 includes a host device 1002 and an NVMe device 1004 (e.g., an example of a data storage device). The host device 1002 includes a host memory 1006, which includes host queues 1008 (such as the aforementioned SQs and CQs), data buffers 1010, and other memory components 1012. The NVMe device 1004 includes memory arrays 1014, an NVMe device controller 1016, and a DRAM 1018. The NVMe device controller 1016 includes one or more processors 1020 that are responsible for the execution of Front-End and Back-End tasks and other task, The NVMe device controller 1016 includes a command fetcher (e.g., and SQ selector) 1022 configured to fetch commands from the submission queues (SQs) at the host device 1002, parse the commands, and queue the commands internally. The NVMe device controller 1016 includes a command executer 1024 for arbitrating the commands and handling the execution of the commands (e.g., as discussed herein). The NVMe device controller 1016 includes doorbell storage 1026 for monitoring doorbell transactions, storing historical doorbell transaction information (e.g., a history of host device submission queue doorbell writes) and statistics thereon, and generating a prediction (e.g., an estimate) as to whether a particular submission queue contains a FUSED command or other similar command (e.g., as discussed herein).

The NVMe device controller 1016 also includes various support components. These components include a control path module 1028, a scheduler 1030, a PCIe MAC PHY interface 1032, DMAs 1034, an error correction module 1036, a flash interface module 1038, and a DRAM controller 1040. In operation, the control path module 1028 may be responsible for managing the host completion queues. Among other functions, the control path module 1028 routes completion entries received from the scheduler 1030 to a completion queue (CQ) within the host device 1002 via the PCIe MAC PHY interface 1032. Pages of data to be delivered to the host device (such as the result of read commands) may be delivered using one or more of the DMAs 1034. The flash interface module 1038 is responsible for controlling and accessing the memory arrays 1014. The error correction module 1036 is responsible for error correction on data handled by the NVMe device controller 1016. Ingress and egress from the NVMe device 1004 are illustrated via arrows 1042 and 1044, respectively.

In some aspects, the command fetcher 1022 and the command executer 1024 may implement the command fetching and executing control functionality described herein. The command fetcher 1022 is responsible for fetching NVMe commands from the host device 1002 while managing and arbitrating the supported submission queues. The command executer 1024 gets NVMe commands from the command fetcher, parses them, and starts their execution phase. In accordance with the teachings herein, the command executer 1024 detects that a first part of a FUSED command has arrived and, based on that detection, the arbitration scheme is dynamically change by increasing the priority of the relevant submission queue (e.g., the command executer 1024 sends an indication of the increased submission queue priority to the command fetcher 1022). In some embodiments, the command executer 1024 may drop the first part of a FUSED command and trigger the command fetcher 1022 to re-fetch the first part of the FUSED command with the second part of a FUSED command during a subsequent arbitration round. In some embodiments, the command fetcher 1022 predicts when a FUSED command is located in a submission queue and fetches the two parts of the FUSED command together (e.g., as a single entity) in advanced.

Commands may be held temporarily in the DRAM 1018 or memory of the host device 1002 (e.g., HMB) until blocking is released. During this period, a command slot (e.g., a register in the NVMe controller 1016) is free and available for the execution of other commands.

Example SSD Storage Device

Figure 11:
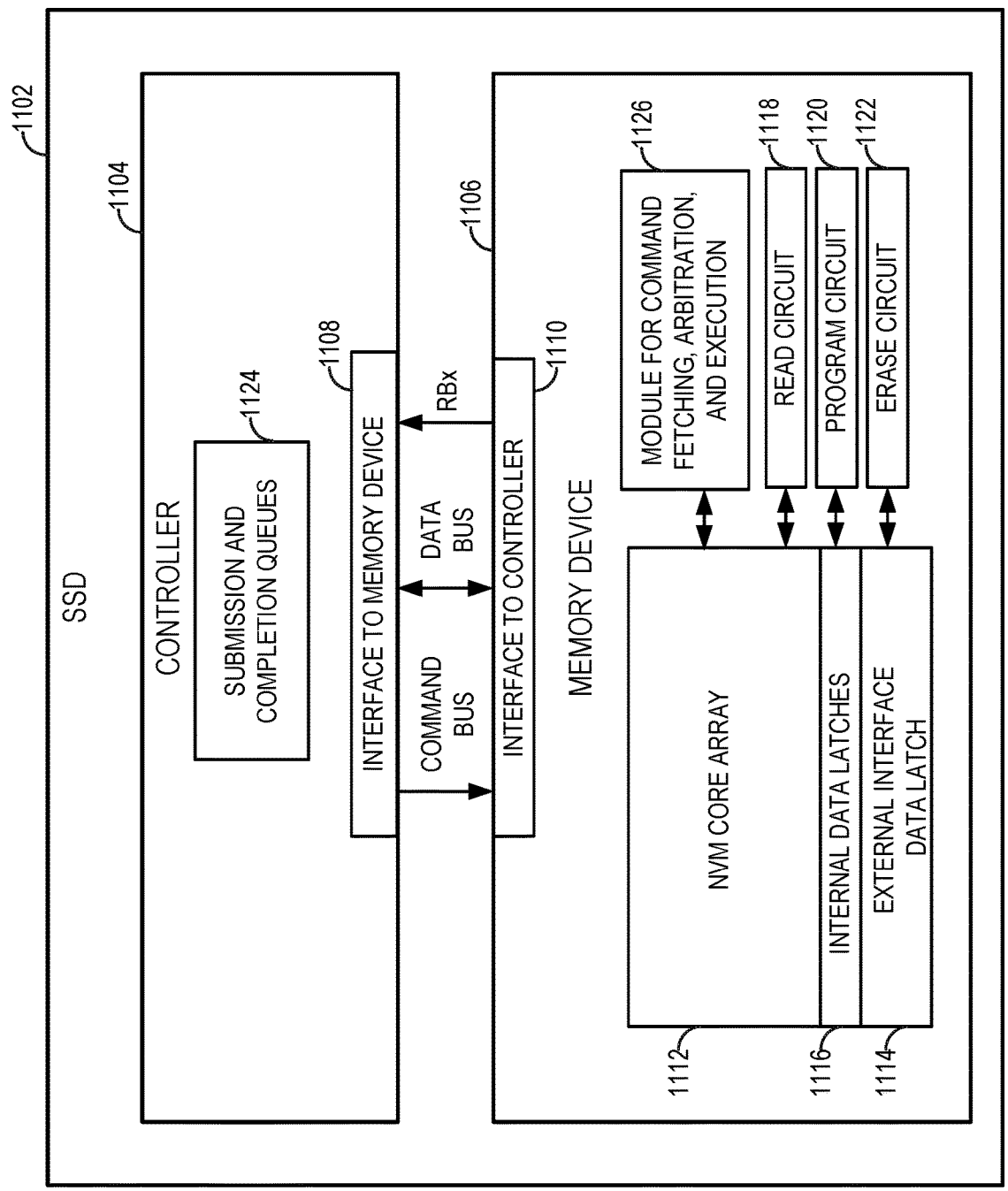
FIG. 11 illustrates an example of a solid state device (SSD) configured in accordance with one or more aspects of the disclosure.

FIG. 11 illustrates an embodiment of an SSD 1102 that may report available physical storage space as taught herein. The SSD 1102 includes a controller 1104 that writes data to and reads data from a memory device 1106 (e.g., an NVM), and performs other associated data storage operations.

The controller 1104 and the memory device 1106 communicate with one another via corresponding interfaces. The controller 1104 includes a memory device input/output (I/O) interface 1108 for sending commands to the memory device (e.g., via a command bus), sending data to and receiving data from the memory device 1106 (e.g., via a data bus), and for sending and receiving other signaling as applicable (e.g., a read/busy indication (RBx) generated by the memory device 1106). Similarly, the memory device 1106 includes a controller interface 1110 for receiving commands from the controller 1104 (e.g., via a command bus), sending data to and receiving data from the controller 1104 (e.g., via a data bus), and for sending and receiving other signaling as applicable (e.g., RBx).

The memory device 1106 includes an NVM core array 1112 for storing data, an external interface data latch 1114 for outputting stored data to and receiving data to be stored from the controller interface 1110, and a set of internal data latches 1116 for storing operational data that is used by the memory device 1106. The memory device 1106 also includes a read circuit 1118 for reading data from the multi-tier NVM core array 1112, a program circuit 1120 for writing data to the multi-tier NVM core array 1112, and an erase circuit 1122 for erasing data in the multi-tier NVM core array 1112.

In accordance with the teachings herein, the controller 1104 includes a module for command fetching, arbitration, and execution 1126 that may be configured to perform one or more of the operations described herein. For example, the module for command fetching, arbitration, and execution 1126 may correspond to the module for command fetching, arbitration, and execution 120 of FIG. 1 and perform one or more of the reporting-related operations described herein in conjunction with FIGS. 1-9, 13, and 15.

First Example Apparatus

Figure 12:
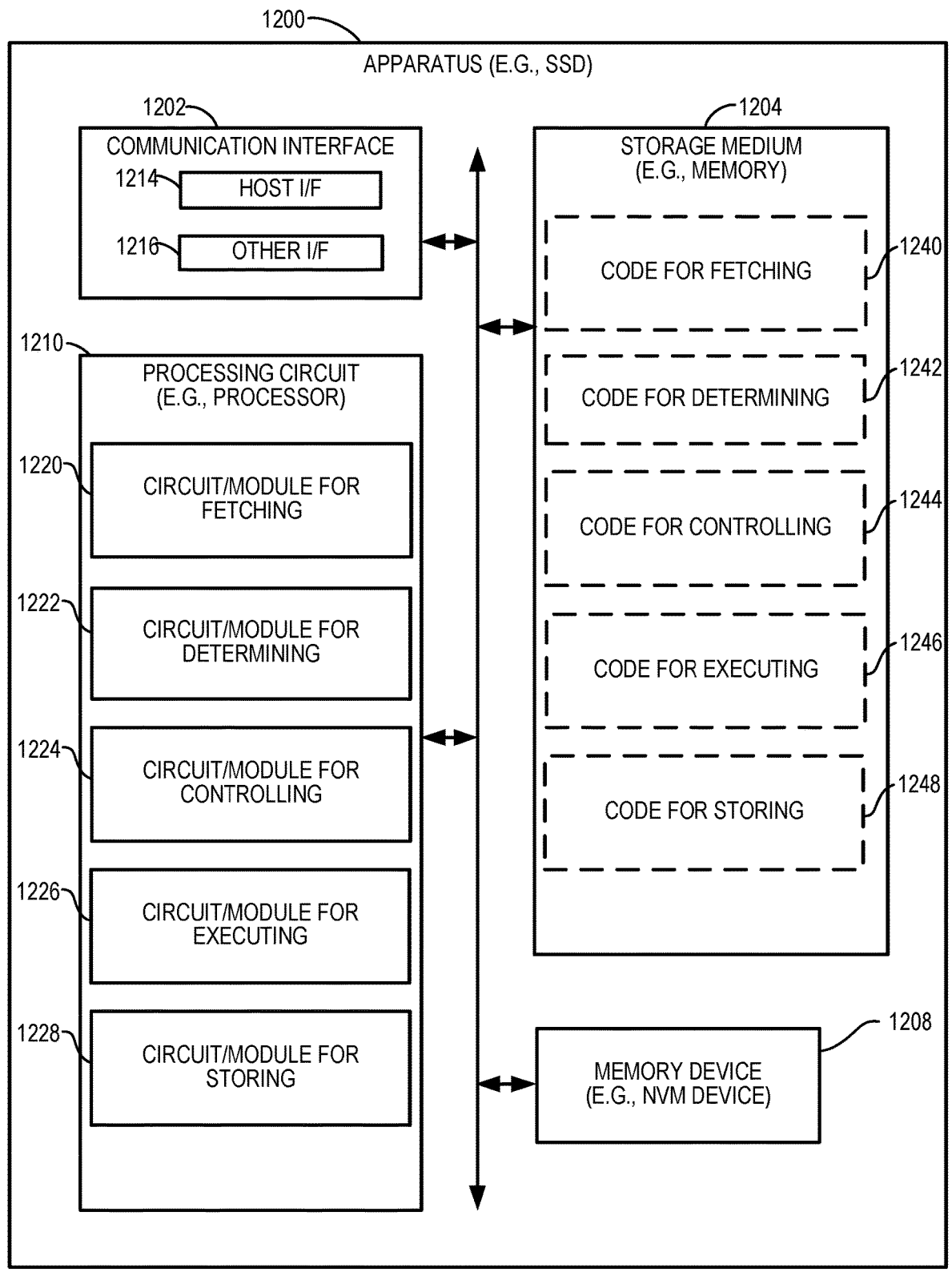
FIG. 12 illustrates an example hardware implementation for an apparatus (e.g., an electronic device) for data storage in accordance with one or more aspects of the disclosure.

FIG. 12 illustrates an embodiment of an apparatus 1200 configured to communicate according to one or more aspects of the disclosure. The apparatus 1200 could embody or be implemented within a data storage device, an SSD, a memory controller, a solid state drive, a host device, an NVM device, a NAND die, or some other type of device that supports data storage. In various implementations, the apparatus 1200 could embody or be implemented within a computing device, a personal computer, a portable device, or workstation, a server, a personal digital assistant, a digital camera, a digital phone, an entertainment device, a medical device, or any other electronic device that stores data.

The apparatus 1200 includes a communication interface 1202, a storage medium 1204, a memory device (e.g., an NVM device) 1208, and a processing circuit 1210 (e.g., at least one processor and/or other suitable circuitry). These components can be coupled to and/or placed in electrical communication with one another via a signaling bus or other suitable component, represented generally by the connection lines in FIG. 12. The signaling bus may include any number of interconnecting buses and bridges depending on the specific application of the processing circuit 1210 and the overall design constraints. The signaling bus links together various circuits such that each of the communication interface 1202, the storage medium 1204, and the memory device 1208 are coupled to and/or in electrical communication with the processing circuit 1210. The signaling bus may also link various other circuits (not shown) such as timing sources, peripherals, voltage regulators, and power management circuits, which are well known in the art, and therefore, will not be described any further.

The communication interface 1202 provides a means for communicating with other apparatuses over a transmission medium. In some implementations, the communication interface 1202 includes circuitry and/or programming (e.g., a program) adapted to facilitate the communication of information bi-directionally with respect to one or more devices in a system. In some implementations, the communication interface 1202 may be configured for wire-based communication. For example, the communication interface 1202 could be a bus interface, a send/receive interface, or some other type of signal interface including drivers, buffers, or other circuitry for outputting and/or obtaining signals (e.g., outputting signal from and/or receiving signals into an integrated circuit). The communication interface 1202 serves as one example of a means for receiving and/or a means for transmitting. In some implementations, the communication interface 1202 may be configured for wireless communication. In some implementations, the communication interface includes a host interface 1214. In some implementations, the communication interface may include at least one other interface 1216. For example, the communication interface 1202 may include at least one radio frequency (RF) receiver and/or RF transmitter (e.g., collectively an RF transceiver).

The memory device 1208 may represent one or more memory devices. As indicated, the memory device 1208 may maintain mapping information 1218 along with other information used by the apparatus 1200. In some implementations, the memory device 1208 and the storage medium 1204 are implemented as a common memory component. The memory device 1208 may also be used for storing data that is manipulated by the processing circuit 1210 or some other component of the apparatus 1200.

The storage medium 1204 may represent one or more computer-readable, machine-readable, and/or processor-readable devices for storing programming, such as processor executable code or instructions (e.g., software, firmware), electronic data, databases, or other digital information. The storage medium 1204 may also be used for storing data that is manipulated by the processing circuit 1210 when executing programming. The storage medium 1204 may be any available media that can be accessed by a general purpose or special purpose processor, including portable or fixed storage devices, optical storage devices, and various other mediums capable of storing, containing or carrying programming.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1204 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium. For example, the storage medium 1204 may be a non-transitory computer-readable medium storing computer-executable code, including code to perform operations as described herein.

The storage medium 1204 may be coupled to the processing circuit 1210 such that the processing circuit 1210 can read information from, and write information to, the storage medium 1204. That is, the storage medium 1204 can be coupled to the processing circuit 1210 so that the storage medium 1204 is at least accessible by the processing circuit 1210, including examples where at least one storage medium is integral to the processing circuit 1210 and/or examples where at least one storage medium is separate from the processing circuit 1210 (e.g., resident in the apparatus 1200, external to the apparatus 1200, distributed across multiple entities, etc.).

Programming stored by the storage medium 1204, when executed by the processing circuit 1210, causes the processing circuit 1210 to perform one or more of the various functions and/or process operations described herein. For example, the storage medium 1204 may include operations configured for regulating operations at one or more hardware blocks of the processing circuit 1210, as well as to utilize the communication interface 1202 for wireless communication utilizing their respective communication protocols.

The processing circuit 1210 is generally adapted for processing, including the execution of such programming stored on the storage medium 1204. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1210 is arranged to obtain, process and/or send data, control data access and storage, issue commands, and control other desired operations. The processing circuit 1210 may include circuitry configured to implement desired programming provided by appropriate media in at least one example. For example, the processing circuit 1210 may be implemented as one or more processors, one or more controllers, and/or other structure configured to execute executable programming. Examples of the processing circuit 1210 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1210 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 1210 are for illustration and other suitable configurations within the scope of the disclosure are also contemplated.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIGS. 1-9 and 13. As used herein, the term "adapted" in relation to the processing circuit 1210 may refer to the processing circuit 1210 being one or more of configured, employed, implemented, and/or programmed to perform a particular process, function, operation and/or routine according to various features described herein.

The processing circuit 1210 may be a specialized processor, such as an application-specific integrated circuit (ASIC) that serves as a means for (e.g., structure for) carrying out any one of the operations described in conjunction with FIGS. 1-9 and 13. The processing circuit 1210 serves as one example of a means for sending and/or a means for receiving. In various implementations, the processing circuit 1210 may provide and/or incorporate, at least in part, the functionality described above for the controller 108 of FIG. 1.

According to at least one example of the apparatus 1200, the processing circuit 1210 may include one or more of a circuit/module for fetching 1220, a circuit/module for determining 1222, a circuit/module for controlling 1224, a circuit/module for executing 1226, or a circuit/module for storing 1228.

As mentioned above, a program stored by the storage medium 1204, when executed by the processing circuit 1210, causes the processing circuit 1210 to perform one or more of the various functions and/or process operations described herein. For example, the program may cause the processing circuit 1210 to perform the various functions, steps, and/or processes described herein with respect to FIGS. 1-9 and 13 in various implementations. As shown in FIG. 12, the storage medium 1204 may include one or more of code for fetching 1240, code for determining 1242, code for controlling 1244, code for executing 1246, or code for storing 1248.

First Example Process

Figure 13:
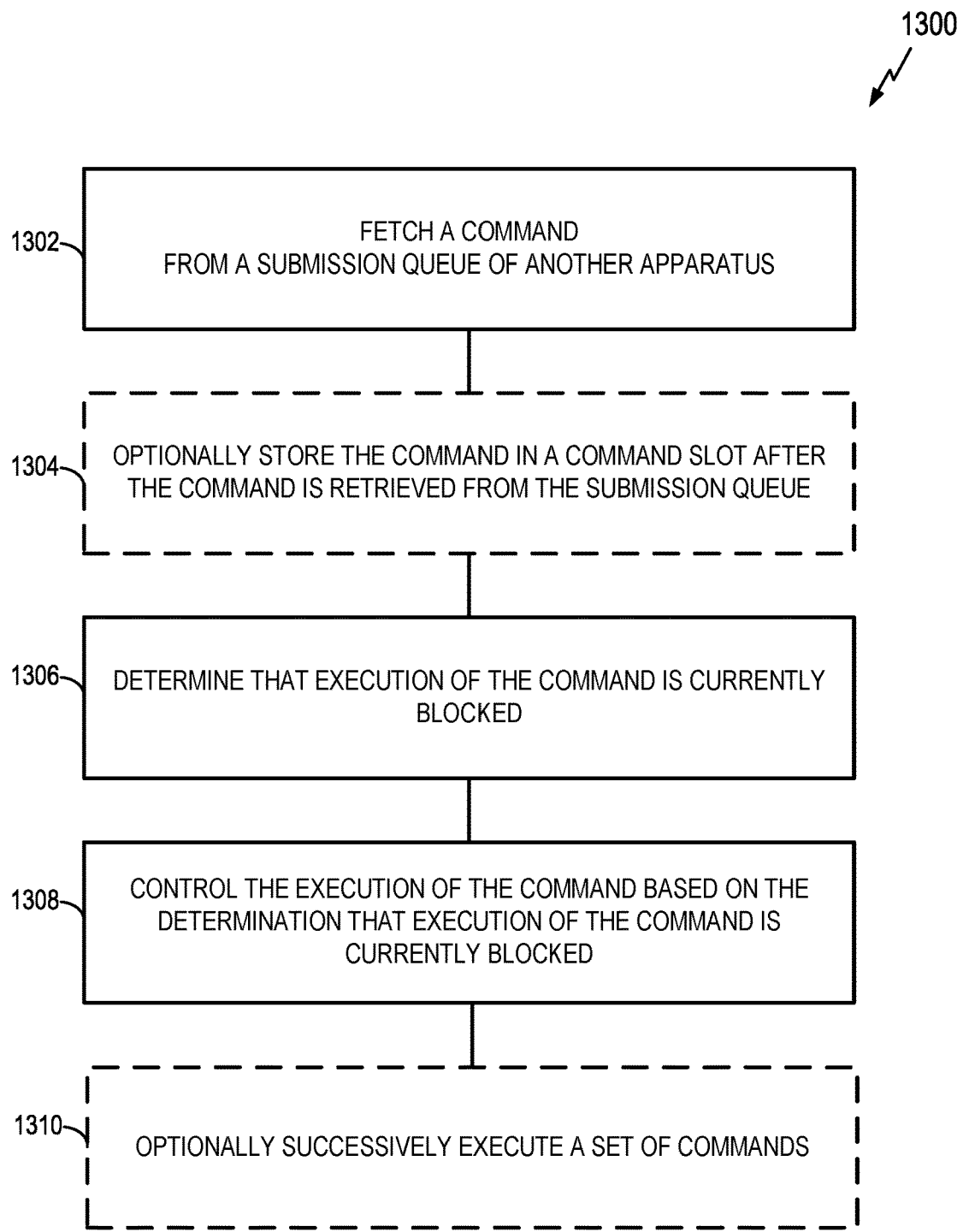
FIG. 13 illustrates an example process for controlling command execution in accordance with one or more aspects of the disclosure.

FIG. 13 illustrates a process 1300 for communication in accordance with some aspects of the disclosure. The process 1300 may take place within a processing circuit (e.g., the processing circuit 1210 of FIG. 12), which may be located in a data storage device, a controller, an SSD, a host device, an NVM device, a NAND die, or some other suitable apparatus. Of course, in various aspects within the scope of the disclosure, the process 1300 may be implemented by any suitable apparatus capable of supporting memory-related operations.

At block 1302, an apparatus (e.g., a controller of a data storage apparatus) fetches a command from a submission queue of another apparatus.

At optional block 1304, the apparatus may store the command in a command slot after the command is retrieved from the submission queue.

At block 1306, the apparatus determines that execution of the command is currently blocked. In some aspects, the determination that execution of the command is currently blocked may include a determination that the execution is blocked due to a condition internal to the data storage apparatus. In some aspects, to determine that execution of the command is currently blocked, the apparatus may determine a quantity of commands that are currently blocked in command slots of the data storage apparatus, and determine that the quantity is greater than or equal to a threshold. In some aspects, the determination that execution of the command is currently blocked may include a determination that the execution is blocked due to a condition external to the data storage apparatus. In some aspects, to determine that execution of the command is currently blocked, the apparatus may determine that the command is part of a plurality of commands having a defined execution order, and determine that the command precedes at least one command of the plurality of commands. In some aspects, the plurality of commands may include (e.g., may be) a FUSED command.

At block 1308, the apparatus controls the execution of the command based on the determination that execution of the command is currently blocked.

At optional block 1310, the apparatus may successively execute a plurality of commands (e.g., the commands of a FUSED command).

In some aspects, the process 1300 may include storing the command in a command slot after the command is retrieved from the submission queue. In some aspects, to control the execution of the command, the apparatus may: estimate a period of time that the command will remain blocked, determine that the period of time is less than or equal to a threshold, and as a result of the determination that the period of time is less than or equal to the threshold, wait to execute the command from the command slot until the command ceases to be blocked. In some aspects, to control the execution of the command, the apparatus may: estimate a period of time that the command will remain blocked, determine that the period of time is greater than or equal to a threshold, store the command in a memory as a result of the determination that the period of time is greater than or equal to a threshold, free-up the command slot after the command is stored, determine, subsequent to the command slot being freed-up, that the command is no longer blocked, and copy the command from the memory into the freed-up command slot or another command slot in response to the determination that the command is no longer blocked.

In some aspects, the process 1300 may include determining that the command is part of a plurality of commands having a defined execution order, and determining that the command precedes at least one command of the plurality of commands. In some aspects, the process 1300 may further include increasing a priority of the submission queue as a result of the determination that the command precedes at least one command of the plurality of commands. In some aspects, the process 1300 may further include storing the command in a command slot after the command is retrieved from the submission queue; freeing-up the command slot as a result of the determination that the command precedes at least one command of the plurality of commands, and collectively fetching the command and the at least one command from the submission queue after the command slot is freed-up. In some aspects, the process 1300 may further include storing the command in a command slot after the command is retrieved from the submission queue, storing the command in a memory as a result of the determination that the command precedes at least one command of the plurality of commands, freeing-up the command slot after the command is stored, determining, subsequent to the command slot being freed-up, that the command is no longer blocked, and as a result of the determination that the command is no longer blocked, copying the command for execution into the freed-up command slot or another command slot.

In some aspects, a process in accordance with the teachings herein may include any combination of the above operations.

Second Example Apparatus

Figure 14:
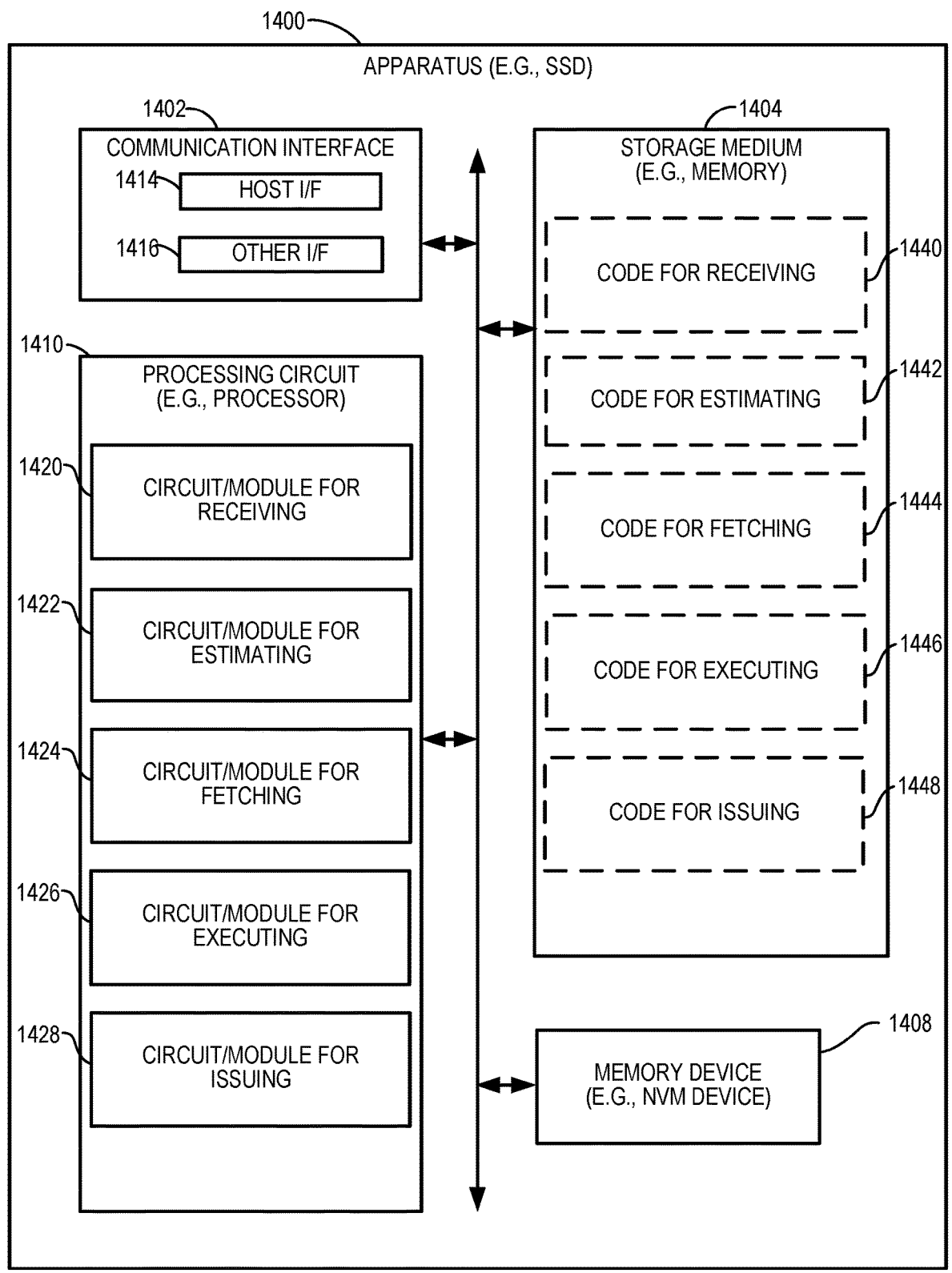
FIG. 14 illustrates an example hardware implementation for an apparatus (e.g., an electronic device) for data storage in accordance with one or more aspects of the disclosure.

FIG. 14 illustrates an embodiment of an apparatus 1400 configured to communicate according to one or more aspects of the disclosure. The apparatus 1400 could embody or be implemented within a data storage device, an SSD, a memory controller, a solid state drive, a host device, an NVM device, a NAND die, or some other type of device that uses data storage. In various implementations, the apparatus 1400 could embody or be implemented within a computing device, a personal computer, a portable device, or workstation, a server, a personal digital assistant, a digital camera, a digital phone, an entertainment device, a medical device, or any other electronic device that stores data.

The apparatus 1400 includes a communication interface 1402, a storage medium 1404, a user interface 1406, a memory device 1408 (e.g., storing report information 1418), and a processing circuit 1410 (e.g., at least one processor and/or other suitable circuitry). In various implementations, the user interface 1406 may include one or more of: a keypad, a display, a speaker, a microphone, a touchscreen display, of some other circuitry for receiving an input from or sending an output to a user. In some implementations, the communication interface 1402 includes an SSD storage device interface 1414. In some implementations, the communication interface 1402 may include a user interface 1416. In some implementations, the communication interface 1402 may include at least one other interface. For example, the communication interface 1402 may include at least one radio frequency (RF) receiver and/or RF transmitter (e.g., collectively an RF transceiver). In general, the components of FIG. 14 may be similar to corresponding components of the apparatus 1200 of FIG. 12.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-9 and 15. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application-specific integrated circuit (ASIC) that serves as a means for (e.g., structure for) carrying out any one of the operations described in conjunction with FIGS. 1-9 and 15. The processing circuit 1410 serves as one example of a means for sending and/or a means for receiving. In various implementations, the processing circuit 1410 may provide and/or incorporate, at least in part, the functionality described above for the controller 108 of FIG. 1.

According to at least one example of the apparatus 1400, the processing circuit 1410 may include one or more of a circuit/module for receiving 1420, a circuit/module for determining 1422, a circuit/module for fetching 1424, a circuit/module for executing 1426, or a circuit/module for issuing 1428.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-9 and 15 in various implementations. As shown in FIG. 14, the storage medium 1404 may include one or more of code for receiving 1440, code for determining 1442, code for fetching 1444, code for executing 1446, or code for issuing 1448.

Second Example Process

Figure 15:
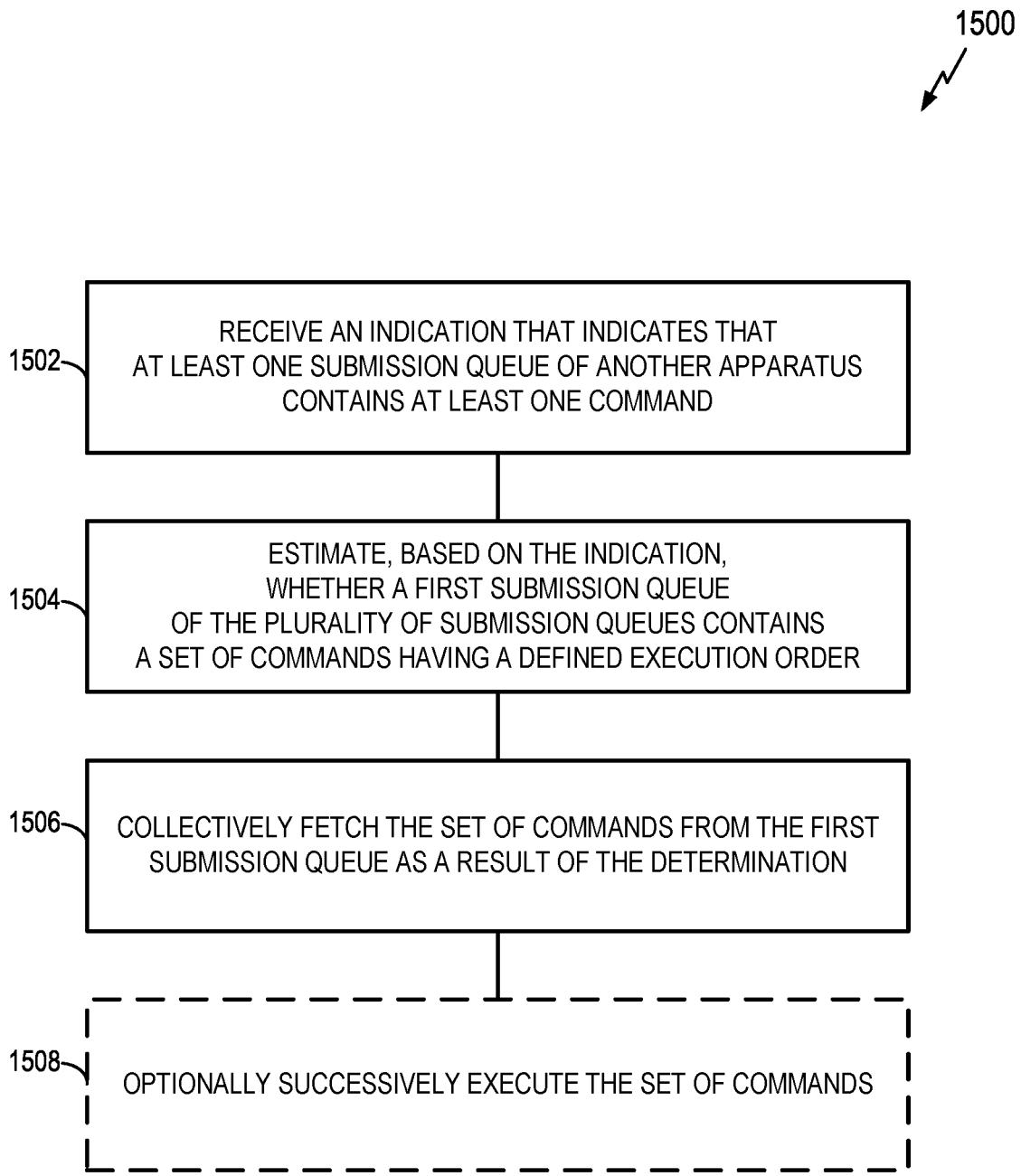
FIG. 15 illustrates an example process for controlling command fetching in accordance with one or more aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a data storage device, an SSD, a memory controller, a solid state drive, a host device, an NVM device, a NAND die, or some other suitable apparatus. Of course, in various aspects within the scope of the disclosure, the process 1500 may be implemented by any suitable apparatus capable of supporting memory-related operations.

At block 1502, an apparatus (e.g., a controller of a data storage apparatus) receives an indication that indicates that at least one submission queue of another apparatus contains at least one command.

At block 1504, the apparatus estimates, based on the indication received at block 1502, whether a first submission queue of the plurality of submission queues contains a plurality of commands having a defined execution order. In some aspects, the plurality of commands may include (e.g., may be) a FUSED command. In some aspects, the indication may be a result of a doorbell transaction by the other apparatus. In some aspects, the estimation of whether the first submission queue contains a plurality of commands having a defined execution order may include: a determination that the indication indicates that the first submission queue contains more than one command.

At block 1506, the apparatus collectively fetches the plurality of commands from the first submission queue as a result of the determination. In some aspects, to collectively fetch the plurality of commands from the first submission queue, the apparatus may issue a single read request to the other apparatus for the plurality of commands. In some aspects, to collectively fetch the plurality of commands from the first submission queue, the apparatus may issue successive read requests to the other apparatus.

At optional block 1508, the apparatus may successively execute a plurality of commands (e.g., the commands of a FUSED command).

In some aspects, the process 1500 may include determining that the other apparatus has repeatedly written commands having a defined execution order to the first submission queue, wherein the estimation of whether the first submission queue contains a plurality of commands having a defined execution order is further based on the determination that the other apparatus has repeatedly written commands having a defined execution order to the first submission queue.

In some aspects, the process 1500 may include determining a rate at which the other apparatus has written commands having a defined execution order to the first submission queue, and determining that the rate is greater than or equal to a threshold, wherein the estimation of whether the first submission queue contains a plurality of commands having a defined execution order is further based on the determination that the rate is greater than or equal to a threshold.

In some aspects, a process in accordance with the teachings herein may include any combination of the above operations.

Additional Aspects

An example of another process for communication in accordance with some aspects of the disclosure follows. This process may take place within a processing circuit (e.g., the processing circuit 1210 of FIG. 12), which may be located in a data storage device, a controller, an SSD, a host device, an NVM device, a NAND die, or some other suitable apparatus. Of course, in various aspects within the scope of the disclosure, this process may be implemented by any suitable apparatus capable of supporting memory-related operations.

At a first block, an apparatus (e.g., a controller of a data storage apparatus) fetches a command from a submission queue of a host device.

At a second block, the apparatus stores the command in a command slot.

At a third block, the apparatus determines that execution of the command is currently blocked. In some aspects, the determination that execution of the command is currently blocked may include determining whether the execution is blocked due to a condition internal to the data storage apparatus or a condition external to the data storage apparatus. In some aspects, the determination that execution of the command is currently blocked may include estimating a period of time that the command will remain blocked, and determining that the period of time is greater than or equal to a threshold. In some aspects, the determination that execution of the command is currently blocked may include determining a quantity of commands that are currently blocked in command slots of the data storage apparatus, and determining that the quantity is greater than or equal to a threshold. In some aspects, the determination that execution of the command is currently blocked may be based on at least one period of time associated with execution of the quantity of commands. In some aspects, the determination that execution of the command is currently blocked may include determining that the command is part of a plurality of commands having a defined execution order, and determining that at least one command of the plurality of commands has not been fetched from the submission queue. In some aspects, the plurality of commands may include (e.g., may be) a FUSED command.

At a fourth block, the apparatus controls the execution of the command based on the determination that execution of the command is currently blocked. In some aspects, the controlling of the execution of the command may include: determining that a period of time that the command will remain blocked is less than or equal to a threshold, and as a result of the determination that the period of time is less than or equal to the threshold, leaving the command in the command slot for execution after the command ceases to be blocked. In some aspects, the controlling of the execution of the command may include: determining that a period of time that the command will remain blocked is greater than or equal to a threshold, storing the command in a memory, reallocating the command slot for another command, determining that the command is no longer blocked, and copying the command from the memory to another command slot for execution. In some aspects, the controlling of the execution of the command may include: determining that the command is part of a plurality of commands having a defined execution order, determining that at least one command of the plurality of commands has not been fetched from the submission queue, increasing a priority of the submission queue as a result of the determination that at least one command of the plurality of commands has not been fetched from the submission queue, fetching the at least one command from the submission queue, and successively executing the command and the at least one command. In some aspects, the controlling of the execution of the command may include: determining that the command is part of a plurality of commands having a defined execution order, determining that at least one command of the plurality of commands has not been fetched from the submission queue, reallocating the command slot to another command as a result of the determination that at least one command of the plurality of commands has not been fetched from the submission queue, collectively fetching the command and the at least one command from the submission queue, and successively executing the command and the at least one command. In some aspects, the controlling of the execution of the command may include: determining that the command is part of a plurality of commands having a defined execution order, determining that at least one command of the plurality of commands has not been fetched from the submission queue, storing the command in a memory as a result of the determination that at least one command of the plurality of commands has not been fetched from the submission queue, reallocating the command slot for another command after the command is stored, subsequently determining that the command is no longer blocked, copying the command from the memory into another command slot for execution, fetching the at least one command from the submission queue, and successively executing the command and the at least one command.

In some aspects, a process in accordance with the teachings herein may include any combination of the above operations.

Another example of a process for communication in accordance with some aspects of the disclosure follows. This process may take place within a processing circuit (e.g., the processing circuit 1410 of FIG. 14), which may be located in a data storage device, an SSD, a memory controller, a solid state drive, a host device, an NVM device, a NAND die, or some other suitable apparatus. Of course, in various aspects within the scope of the disclosure, this process may be implemented by any suitable apparatus capable of supporting memory-related operations.

At a first block, an apparatus (e.g., a controller of a data storage apparatus) receives an indication that at least one submission queue of a plurality of submission queues of a host device contains at least one command. In some aspects, the indication may be a result of the host device invoking a doorbell transaction that involves a write to a memory location in a data storage device.

At a second block, the apparatus estimates, based on the indication, whether a first submission queue of the plurality of submission queues contains a plurality of commands having a defined execution order. In some aspects, the plurality of commands may include (e.g., may be) a FUSED command. In some aspects, the estimation of whether the first submission queue contains a plurality of commands having a defined execution order may include determining whether the indication indicates that more than one command has been queued in the first submission queue. In some aspects, the plurality of commands may include (e.g., may be) a FUSED command. In some aspects, the estimation of whether the first submission queue contains a plurality of commands having a defined execution order may include determining whether the host device has repeatedly written commands having a defined execution order to the first submission queue. In some aspects, the estimation of whether the first submission queue contains a plurality of commands having a defined execution order may include determining whether a rate at which the host device has written commands having a defined execution order to the first submission queue is greater than or equal to a threshold.

At a third block, the apparatus collectively fetches the plurality of commands from the first submission queue as a result of the estimation. In some aspects, collectively fetching the plurality of commands from the first submission queue may include issuing a single read request to the host device for the plurality of commands or successively issuing read requests to the host device for individual ones of the plurality of commands.

At a fourth block, the apparatus executes each command of the plurality of commands in succession.

In some aspects, a process in accordance with the teachings herein may include any combination of the above operations.

Yet another example of a process for communication in accordance with some aspects of the disclosure follows. This process may take place within a processing circuit (e.g., the processing circuit 1410 of FIG. 14), which may be located in a data storage device, an SSD, a memory controller, a solid state drive, a host device, an NVM device, a NAND die, or some other suitable apparatus. Of course, in various aspects within the scope of the disclosure, this process may be implemented by any suitable apparatus capable of supporting memory-related operations.

At a first block, an apparatus (e.g., a controller of a data storage apparatus) collects information indicative of types of commands written to a plurality of submission queues of a host device. For example, the apparatus may determine, for each submission queue, a rate at which a host device writes commands having a defined execution order to the submission queue.

At a second block, the apparatus determines at least one statistic regarding whether a command of a certain type is written to a first submission queue of the plurality of submission queues. For example, the apparatus may determine a rate at which the host device writes commands having a defined execution order to the first submission queue.

At a third block, the apparatus estimates, based on the at least one statistic, whether the first submission queue contains a plurality of commands having a defined execution order.

At an optional fourth block, the apparatus may further estimate, based on whether the first submission queue contains a plurality of commands, whether the first submission queue contains a plurality of commands having a defined execution order.

In some aspects, a process in accordance with the teachings herein may include any combination of the above operations.

Other Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage apparatus, comprising:
a non-volatile memory array;
an interface; and
one or more processors coupled to the non-volatile memory array and the interface and configured to:

receive an indication from another apparatus via the interface, wherein the indication indicates that at least one submission queue of a plurality of submission queues of the other apparatus contains at least one executable command, estimate, based on the indication, whether a first submission queue of the plurality of submission queues contains a plurality of executable commands having a defined execution order, collectively fetch the plurality of executable commands from the first submission queue as a result of the estimation, successively execute the plurality of executable commands in accordance with the defined execution order, and determine that the other apparatus has repeatedly written executable commands having the defined execution order to the first submission queue, wherein the estimation of whether the first submission queue contains the plurality of executable commands having the defined execution order is further based on the determination that the other apparatus has repeatedly written executable commands having the defined execution order to the first submission queue.

2. The apparatus of claim 1, wherein the plurality of executable commands comprises a FUSED command.

3. The apparatus of claim 1, wherein the estimation of whether the first submission queue contains the plurality of executable commands having the defined execution order comprises:
   a determination that the indication indicates that the first submission queue contains more than one executable command.

4. The apparatus of claim 1, wherein, to collectively fetch the plurality of executable commands from the first submission queue, the one or more processors is further configured to:
   issue a single read request to the other apparatus for the plurality of executable commands.

5. The apparatus of claim 1, wherein, to collectively fetch the plurality of executable commands from the first submission queue, the one or more processors is further configured to:
   issue successive read requests to the other apparatus.

6. The apparatus of claim 1, wherein the plurality of executable commands having the defined execution order comprises at least one write command.

7. The apparatus of claim 1, wherein the defined execution order specifies that no other command is to be executed between execution of each of the plurality of executable commands.

8. The apparatus of claim 2, wherein the indication is a result of a doorbell transaction by the other apparatus.

9. A data storage apparatus, comprising:
   a non-volatile memory array;
   an interface; and
   one or more processors coupled to the non-volatile memory array and the interface and configured to:
   receive an indication from another apparatus via the interface, wherein the indication indicates that at least one submission queue of a plurality of submission queues of the other apparatus contains at least one executable command, estimate, based on the indication, whether a first submission queue of the plurality of submission queues contains a plurality of executable commands having a defined execution order, collectively fetch the plurality of executable commands from the first submission queue as a result of the estimation, successively execute the plurality of executable commands in accordance with the defined execution order, determine a rate at which the other apparatus has written executable commands having the defined execution order to the first submission queue; and determine that the rate is greater than or equal to a threshold, wherein the estimation of whether the first submission queue contains the plurality of executable commands having the defined execution order is further based on the determination that the rate is greater than or equal to the threshold.

10. A data storage apparatus, comprising:
    means for receiving an indication that indicates that at least one submission queue of a plurality of submission queues of a host device contains at least one executable command;
    means for estimating, based on the indication, whether a first submission queue of the plurality of submission queues contains a plurality of executable commands having a defined execution order;
    means for collectively fetching a first command and a second command of the plurality of executable commands from the first submission queue as a result of the estimation; and
    means for successively executing the first command and the second command,
    wherein the means for estimating is configured to:
      determine whether the indication indicates that more than one executable command is queued in the first submission queue;
      generate the indication that the first submission queue is estimated to contain the plurality of executable commands having the defined execution order based on the determination of whether the indication indicates that more than one executable command is queued in the first submission queue;
      determine whether the host device has repeatedly written executable commands having the defined execution order to the first submission queue; and
      generate an indication that the first submission queue is estimated to contain the plurality of executable commands having the defined execution order based on the determination of whether the host device has repeatedly written executable commands having the defined execution order to the first submission queue.

* * * * *